United States Patent
Ortega et al.

(10) Patent No.: US 9,799,886 B2
(45) Date of Patent: Oct. 24, 2017

(54) CATHODE WITH SILVER MATERIAL AND SILICATE DOPANT AND METHOD OF PRODUCING

(71) Applicant: ZPower, LLC, Camarillo, CA (US)

(72) Inventors: Jeffrey V. Ortega, Camarillo, CA (US); Hongxia Zhou, Ann Arbor, MI (US); George W. Adamson, Princeton Junction, NJ (US)

(73) Assignee: ZPower, LLC, Camarillo, CA (US)

( * ) Notice: Subject to any disclaimer, the term of this patent is extended or adjusted under 35 U.S.C. 154(b) by 229 days.

(21) Appl. No.: 14/429,846

(22) PCT Filed: Sep. 26, 2013

(86) PCT No.: PCT/US2013/061834
§ 371 (c)(1),
(2) Date: Mar. 20, 2015

(87) PCT Pub. No.: WO2014/052533
PCT Pub. Date: Apr. 3, 2014

(65) Prior Publication Data
US 2015/0249249 A1  Sep. 3, 2015

Related U.S. Application Data

(60) Provisional application No. 61/706,170, filed on Sep. 27, 2012.

(51) Int. Cl.
| | |
|---|---|
| *H01M 10/32* | (2006.01) |
| *H01M 4/13* | (2010.01) |
| *H01M 4/34* | (2006.01) |
| *H01M 4/54* | (2006.01) |
| *H01M 4/48* | (2010.01) |
| *H01M 4/62* | (2006.01) |
| *H01M 4/60* | (2006.01) |
| *H01M 4/24* | (2006.01) |
| *H01M 10/42* | (2006.01) |
| *H01M 4/02* | (2006.01) |

(52) U.S. Cl.
CPC ............ *H01M 4/623* (2013.01); *H01M 4/34* (2013.01); *H01M 4/54* (2013.01); *H01M 4/60* (2013.01); *H01M 4/62* (2013.01); *H01M 10/32* (2013.01); *H01M 4/244* (2013.01); *H01M 10/4235* (2013.01); *H01M 2004/028* (2013.01)

(58) Field of Classification Search
CPC .......... H01M 10/32; H01M 4/13; H01M 4/34; H01M 4/54; H01M 4/48; H01M 4/62
See application file for complete search history.

(56) References Cited

U.S. PATENT DOCUMENTS

| | | |
|---|---|---|
| 2,528,891 A | 11/1950 | Lawson |
| 3,017,448 A | 1/1962 | Cahan |
| 3,057,944 A | 10/1962 | Ruetschi et al. |
| 3,062,909 A | 11/1962 | Reutschi et al. |
| 3,325,311 A | 6/1967 | Huff |
| 3,920,478 A | 11/1975 | Kozawa |
| 3,954,501 A | 5/1976 | Rampel |
| 4,015,056 A | 3/1977 | Megahed et al. |
| 4,037,033 A | 7/1977 | Takamura et al. |
| 4,056,664 A | 11/1977 | Jaffe |
| 4,078,127 A | 3/1978 | Megahed et al. |
| 4,113,921 A | 9/1978 | Goldstein et al. |
| 4,125,689 A | 11/1978 | Jumel |
| 4,167,609 A | 9/1979 | Scarr |
| 4,172,183 A | 10/1979 | Rüetschi |
| 4,209,574 A | 6/1980 | Ruetschi |
| 4,209,578 A | 6/1980 | Balters |
| 4,247,606 A | 1/1981 | Uetani et al. |
| 4,288,733 A | 9/1981 | Bilanceri et al. |
| 4,298,506 A | 11/1981 | Przybyla et al. |
| 4,327,157 A | 4/1982 | Himy et al. |
| 4,338,385 A | 7/1982 | Ohya et al. |
| 4,407,915 A | 10/1983 | Brown |
| 4,465,747 A | 8/1984 | Evans |
| 4,520,087 A | 5/1985 | Kamata et al. |
| 4,835,077 A | 5/1989 | Megahed et al. |
| 5,017,446 A | 5/1991 | Reichman et al. |
| 5,204,195 A | 4/1993 | Tomantschger et al. |

(Continued)

FOREIGN PATENT DOCUMENTS

| | | |
|---|---|---|
| DE | 2813149 | 9/1979 |
| EP | 0563773 | 10/1993 |

(Continued)

OTHER PUBLICATIONS

Dallenbach, R., et al.: "Synthesis of silver (II) oxide by oxidation of silver or silver oxide by means of ozone", Jan. 1, 1982 (Jan. 1, 1982), Polyhendron, Pergamon Press, Oxford, GB, pp. 183-186.
Himy, Albert, "Silver-Zinc Battery: Phenomena and Design Principles", Vantage Press, First Edition, 1986, pp. 26-33 and 67-75.
International Search Report for PCT/US2006/007332 dated Jul. 31, 2007.
International Search Report for PCT/US2009/001888 dated Jul. 30, 2009.
International Search Report for PCT/US2009/062516 dated Feb. 12, 2010.
International Search Report for PCT/US2010/028772 dated Jun. 9, 2010.

(Continued)

*Primary Examiner* — Patrick Ryan
*Assistant Examiner* — Julian Anthony
(74) *Attorney, Agent, or Firm* — Honigman Miller Schwartz and Cohn LLP; Andrew N. Weber; Jonathan P. O'Brien

(57) ABSTRACT

The present invention provides novel cathodes having a reduced resistivity and other improved electrical properties. Furthermore, this invention also presents methods of manufacturing novel electrochemical cells and novel cathodes. These novel cathodes comprise a silver material that is doped with a silicate material.

28 Claims, 13 Drawing Sheets

(56) References Cited

U.S. PATENT DOCUMENTS

| | | |
|---|---|---|
| 5,240,793 A | 8/1993 | Glaeser |
| 5,272,020 A | 12/1993 | Flack |
| 5,281,497 A | 1/1994 | Kordesch et al. |
| 5,290,640 A | 3/1994 | Tsenter et al. |
| 5,336,384 A | 8/1994 | Tsou et al. |
| 5,389,469 A | 2/1995 | Passaniti |
| 5,472,810 A | 12/1995 | Takeuchi et al. |
| 5,478,363 A | 12/1995 | Klein |
| 5,516,340 A | 5/1996 | Takeuchi et al. |
| 5,525,444 A | 6/1996 | Ito et al. |
| 5,558,680 A | 9/1996 | Takeuchi et al. |
| 5,585,208 A | 12/1996 | Lian et al. |
| 5,589,109 A | 12/1996 | Passaniti et al. |
| 5,599,644 A | 2/1997 | Swierbut et al. |
| 5,658,688 A | 8/1997 | Jolson |
| 5,731,105 A | 3/1998 | Fleischer et al. |
| 5,776,637 A | 7/1998 | Kashio et al. |
| 5,837,402 A | 11/1998 | Araki et al. |
| 5,981,105 A | 11/1999 | Smith et al. |
| 6,001,508 A | 12/1999 | Passaniti et al. |
| 6,054,084 A | 4/2000 | Khavari |
| 6,187,475 B1 | 2/2001 | Oh et al. |
| 6,203,947 B1 | 3/2001 | Peled et al. |
| 6,228,534 B1 | 5/2001 | Takeuchi et al. |
| 6,277,169 B1 | 8/2001 | Hampden-Smith et al. |
| 6,287,432 B1 | 9/2001 | Mazanec et al. |
| 6,337,160 B1 | 1/2002 | Hilarius et al. |
| 6,514,637 B2 | 2/2003 | Treger et al. |
| 6,534,219 B1 | 3/2003 | Iijima et al. |
| 6,589,612 B1 | 7/2003 | Cintra et al. |
| 6,685,752 B2 | 2/2004 | Leising et al. |
| 6,696,201 B2 | 2/2004 | Leising et al. |
| 6,797,019 B2 | 9/2004 | Takeuchi et al. |
| 6,830,710 B2 | 12/2004 | Bonnet et al. |
| 7,052,629 B2 | 5/2006 | Maeda et al. |
| 7,132,062 B1 | 11/2006 | Howard |
| 7,771,782 B2 | 8/2010 | Baiocchi et al. |
| 8,936,775 B2 | 1/2015 | Adamson et al. |
| 9,184,440 B2 | 11/2015 | Ortega et al. |
| 9,184,444 B2 | 11/2015 | Zhou et al. |
| 9,209,454 B2 | 12/2015 | Adamson et al. |
| 9,401,509 B2 | 7/2016 | Ortega et al. |
| 2002/0127469 A1 | 9/2002 | Mori et al. |
| 2002/0182489 A1 | 12/2002 | Cheiky et al. |
| 2003/0157405 A1 | 8/2003 | Chen et al. |
| 2003/0207173 A1 | 11/2003 | Wang et al. |
| 2003/0215712 A1 | 11/2003 | Feddrix et al. |
| 2004/0101729 A1 | 5/2004 | Kearl |
| 2004/0202926 A1 | 10/2004 | Clark et al. |
| 2005/0058903 A1 | 3/2005 | Eylem et al. |
| 2005/0074394 A1 | 4/2005 | Berube et al. |
| 2005/0175529 A1 | 8/2005 | Ceder et al. |
| 2005/0181280 A1 | 8/2005 | Ceder et al. |
| 2006/0147809 A1 | 7/2006 | Amine et al. |
| 2006/0228629 A1 | 10/2006 | Christian et al. |
| 2007/0037060 A1 | 2/2007 | Lee et al. |
| 2007/0184334 A1 | 8/2007 | Hong et al. |
| 2008/0038630 A1 | 2/2008 | Cheiky |
| 2008/0187824 A1 | 8/2008 | Tomantschger |
| 2008/0261094 A1 | 10/2008 | Licht et al. |
| 2010/0047689 A1 | 2/2010 | Bugnet et al. |
| 2010/0119941 A1 | 5/2010 | Niessen et al. |
| 2010/0119943 A1* | 5/2010 | Lee .................. H01M 4/48 429/220 |
| 2011/0052981 A1 | 3/2011 | Lopez et al. |
| 2011/0262803 A1 | 10/2011 | Huang et al. |
| 2011/0286912 A1 | 11/2011 | Adamson et al. |
| 2012/0164526 A1 | 6/2012 | Adamson et al. |
| 2013/0071744 A1 | 3/2013 | Zhou et al. |
| 2013/0216901 A1* | 8/2013 | Ortega .................. H01M 4/34 429/206 |
| 2013/0230774 A1 | 9/2013 | Ortega et al. |
| 2014/0227591 A1 | 8/2014 | Adamson et al. |
| 2016/0301077 A1 | 10/2016 | Huang et al. |

FOREIGN PATENT DOCUMENTS

| | | |
|---|---|---|
| EP | 1324408 | 7/2003 |
| EP | 1775787 | 4/2007 |
| GB | 902846 | 8/1962 |
| GB | 1065059 | 4/1967 |
| GB | 2019079 | 10/1979 |
| JP | 53-80530 | 7/1978 |
| JP | 54-008839 | 1/1979 |
| JP | 56-149771 | 11/1981 |
| JP | 57-107565 | 7/1982 |
| JP | 58-119156 | 7/1983 |
| JP | 56-011860 | 2/1984 |
| JP | 59-132567 | 7/1984 |
| JP | 59-184459 | 10/1984 |
| JP | 60-189164 | 9/1985 |
| JP | 2000-164220 | 6/2000 |
| JP | 2001-185116 | 7/2001 |
| JP | 2004-213927 | 7/2004 |
| WO | 03/080906 | 10/2003 |
| WO | 03/096448 | 11/2003 |
| WO | 2006/104633 | 10/2006 |
| WO | 2008/004105 | 1/2008 |
| WO | 2008/007288 | 1/2008 |
| WO | 2009/120352 | 10/2009 |
| WO | 2010/051356 | 5/2010 |
| WO | 2010/111567 | 9/2010 |
| WO | 2011/056813 | 5/2011 |
| WO | 2011/111567 | 9/2011 |
| WO | 2012/040298 | 3/2012 |
| WO | 2012/061449 | 5/2012 |

OTHER PUBLICATIONS

International Search Report for PCT/US2010/055204 dated Mar. 3, 2011.

International Search Report for PCT/US2011/052504 dated Dec. 28, 2011.

International Search Report for PCT/US2011/058877 dated Feb. 8, 2012.

Jirsa, F., et al. "Studien uber hohere Silberoxyde", Z. Anorg Undallg. Chemie, vol. 158, Dec. 31, 1926, pp. 61-66.

Kendall, James, et al., "The Catalytic Influence of Foreign Oxides on the Decomposition of Silver Oxide, Mercuric Oxide and Barium Peroxide", Department of Organic Chemistry, Columbia University, No. 373, 1921, pp. 2017-2031.

Makosza, Mieczyslaw, et al., "Convenient Preparation of Metals Deposited on Supports and Their Use in Organic Synthesis", Tetrahedron, vol. 54, 1998, pp. 10827-10836.

McMillan, J. A., "Higher Oxidation States of Silver", Argonne National Laboratory, Jul. 28, 1961, pp. 65-80.

Tvarusko, Aladar, "The Decomposition of AgO in Alkaline Solutions", Journal of the Electrochemical Society, vol. 116, No. 8, Aug. 1969, pp. 1070-1075.

Tvarusko, Aladar, "The Electric Resistivity of AgO", Journal of the Electrochemical Society, vol. 115, No. 11, Nov. 1968, pp. 1105-1110.

Wales, C. P., et al., "Feasibility of Microscopy for Investigating the Silver Oxide Electrode", Navel Research Laboratory, Washington, D.C., Jan. 9, 1968, NRL Report 6647, complete document.

International Search Report for PCT/US2013/061834 dated Feb. 26, 2014.

* cited by examiner

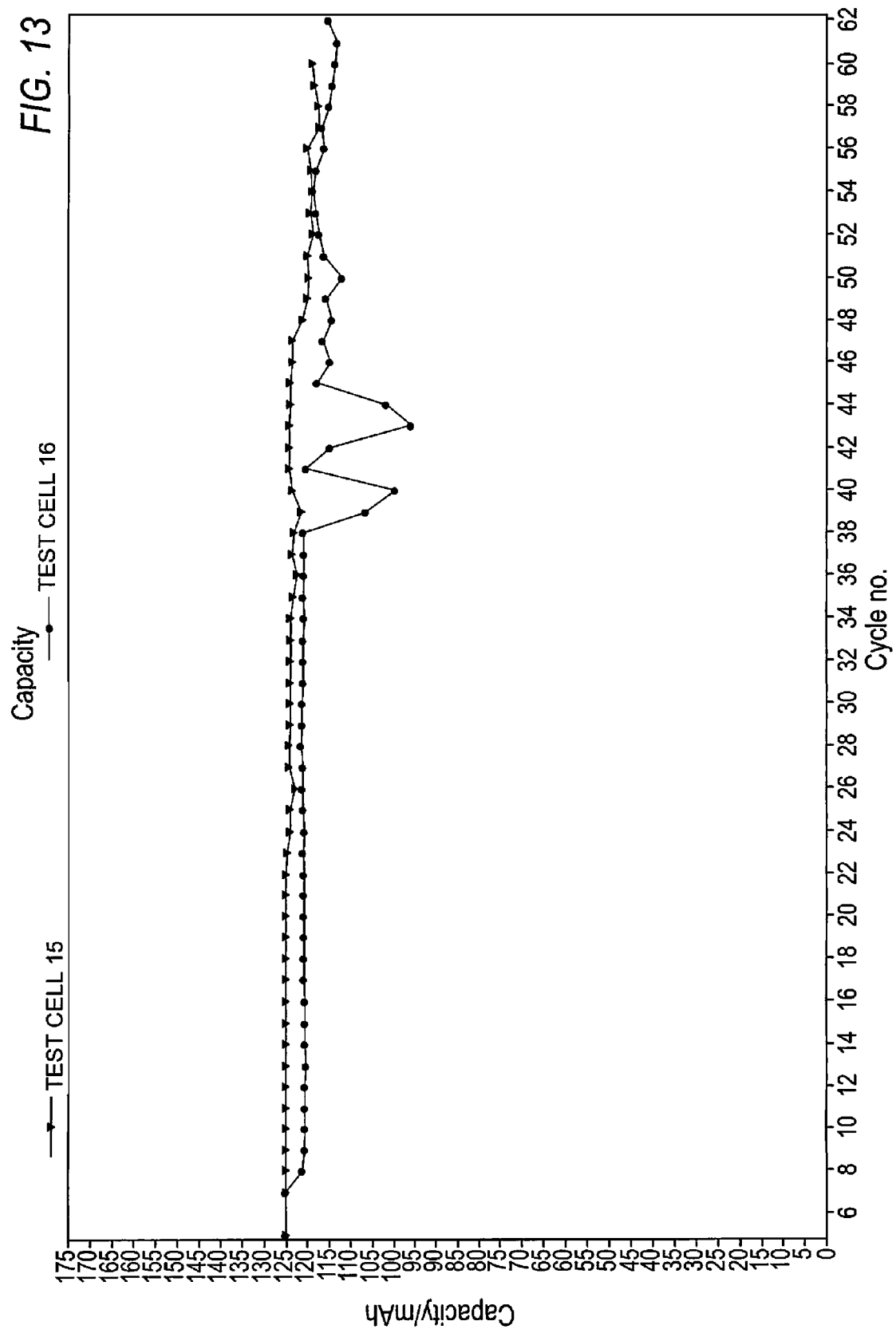

CATHODE WITH SILVER MATERIAL AND SILICATE DOPANT AND METHOD OF PRODUCING

CROSS REFERENCE TO RELATED APPLICATION

This U.S. non-provisional patent application claims the benefit of PCT application no. PCT/US2013/061834, filed on Sep. 26, 2013, which claims priority to U.S. provisional application Ser. No. 61/706,170, filed on Sep. 27, 2012. Each of the aforementioned applications is incorporated herein by reference in its entirety.

FIELD OF THE INVENTION

This invention is concerned with a new cathode formed by doping a cathode material with a dopant that imparts the cathode with one or more improved properties over traditional cathodes.

BACKGROUND

When a traditional battery is discharged, the anode supplies positive ions to an electrolyte and electrons to an external circuit. The cathode is typically an electronically conducting host into which positive ions are inserted reversibly or irreversibly from the electrolyte as a guest species and are charge-compensated by electrons from the external circuit. A secondary battery, or cell, uses a reaction that can be reversed when current is applied to the battery, thus "recharging" the battery. The chemical reactions at the anode and cathode of a secondary battery must be reversible. On charge, the removal of electrons from the cathode by an external field releases positive ions back to the electrolyte to restore the parent host structure, and the addition of electrons to the anode by the external field attracts charge-compensating positive ions back into the anode to restore it to its original composition.

Traditional electrode materials such as cathode active materials suffer a number of drawbacks. For instance, many traditional cathodes possess an elevated impedance or internal resistance that negatively effects battery discharge, and thus, restricts battery performance. As many traditional batteries progress through charge cycles, the deleterious effect of impedance causes an increasing hindrance on battery performance.

Thus, there is a need for electrode materials that have improved properties and can improve battery performance.

SUMMARY OF THE INVENTION

One aspect of the present invention provides a cathode for use in an electrochemical cell comprising a silver material that is doped with a silicate dopant comprising one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

wherein the silver material is doped with a concentration of from about 0.10 mol % to about 10 mol % of the silicate dopant. In some embodiments, the silver material is doped with a concentration of from about 0.25 mol % to about 5 mol % of the silicate dopant. In other embodiments, the silver material is doped with a concentration of from about 0.5 mol % to about 2.5 mol % of the silicate dopant.

In some embodiments, the doped silver material comprises a powder. Some of these powders have a mean particle diameter of about 20 μm or less. Others have a mean particle diameter of about 15 μm or less.

In some embodiments, the silver material comprises Ag, AgO, $Ag_2O$, $Ag_2O_3$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, or any combination thereof.

In some embodiments, the cathode further comprises a binder. For example, the cathode comprises a binder, and the binder comprises PTFE or PVDF.

In some embodiments, the silicate dopant comprises a silicate of formula (i) $X_2SiO_3$, wherein X is Li, Na, K, Rb, Cs, or any combination thereof. In others, the silicate dopant comprises a silicate of formula (ii) $YSiO_3$, wherein Y is Be, Mg, Ca, Sr, Ba, or any combination thereof. And, in some embodiments, the silicate dopant comprises a silicate of formula (iii) $Z_nSi(OR)_m$, wherein Z is a halogen, R is H or a $C_{1-18}$ alkyl group, m is 0 to 4, and n is 4-m. For example, the silicate dopant comprises $K_2SiO_3$, or $Si(OC_2H_5)_4$.

Another aspect of the present invention provides a cathode for use in an electrochemical cell comprising a silver material that is doped with a silicate dopant comprising one or more of the following formulae $X_2SiO_3$, wherein X is Li, Na, K, Rb, Cs, or any combination thereof; or (i)

$Z_nSi(OR)_m$, wherein Z is a halogen, R is H or a $C_{1-18}$ alkyl group, m is 0-4, and n is 4-m, (iii)

wherein the silver material is doped with a concentration of from about 0.01 mol % to about 10 mol % of the silica. In some embodiment, the silver material is doped with a concentration of from about 0.25 mol % to about 5 mol % of silicate dopant. In others, the silver material is doped with a concentration of from about 0.50 mol % to about 2.5 mol % of silicate dopant.

In some embodiments, the doped silver material comprises a powder. Some of these powders have a mean particle diameter of about 20 μm or less. Others have a mean particle diameter of about 15 μm or less.

In some embodiments, the silver material comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

In some embodiments, the cathode further comprises a binder, such as any of the binders described herein.

In some embodiments, the silicate dopant comprises $K_2SiO_3$, $Si(OC_2H_5)_4$, or any combination thereof.

Another aspect of the present invention comprises a method of producing a cathode for use in an electrochemical cell comprising providing a silver powder that is doped with from about 0.01 mol % to about 10 mol % of a silicate dopant; and forming the doped silver powder into a cathode. In some methods, the silver powder is doped with from about 0.10 mol % to about 5 mol % of the silicate dopant. In other methods, the silver powder is doped with from about 0.25 mol % to about 2.5 mol % of the silicate dopant.

In some methods, the doped silver powder has a mean particle diameter of about 20 µm or less. In others, the doped silver powder has a mean particle diameter of about 15 µm or less.

In some methods, the doped silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof. For example, the doped silver powder comprises AgO, $Ag_2O$, $Ag_2O_3$, or any combination thereof.

Some methods also include the step of providing a binder, such as any of the binders described herein.

In some methods, the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

For example, the silicate dopant comprises $K_2SiO_3$, $Si(OC_2H_5)_4$, or any combination thereof.

Another aspect of the present invention provides an electrochemical cell comprising a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

and the silicate dopant is present in a sufficient concentration to impart the cell with an actual capacity of at least about 70% (e.g., from about 75% to about 99% or from about 80% to about 90%) of the cell's rated capacity over at least about 50 cycles.

In some embodiments, the electrochemical cell comprises a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

and the silicate dopant is present in a sufficient concentration to impart the cell with an actual capacity of at least about 60% of the cell's rated capacity over at least about 100 cycles.

In other embodiments, the electrochemical cell comprises a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

and the silicate dopant is present in a sufficient concentration to impart the cell with an actual capacity of at least about 50% of the cell's rated capacity over at least about 120 cycles.

In some of these cells, the silver material comprises from about 0.01 mol % to about 10 mol % of silicate dopant.

In some of these cells, the silver material comprises a powder. For example, the silver material comprises a powder wherein the powder has a mean particle diameter of about 20 µm or less. In other examples, the powder has a mean particle diameter of about 15 µm or less.

In some of these cells, the cathode, the anode, or both comprise a binder. For example, the cathode comprises a binder such as any of the binders described herein. In other examples, the anode comprises a binder, such as any of the binders described herein.

Some of these cells further comprise an electrolyte comprising LiOH, NaOH, KOH, or any combination thereof.

In some of these cells, the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof. For example, the silver powder comprises AgO, $Ag_2O$, $Ag_2O_3$, or any combination thereof.

And, in some of these cells, the silicate dopant comprises $K_2SiO_3$, $Si(OC_2H_5)_4$, or any combination thereof.

Another aspect of the present invention provides an electrochemical cell comprising a cathode comprising a silver powder comprising from about 0.01 mol % to about 10 mol % of a silicate dopant; an anode comprising zinc; and an electrolyte comprising aqueous KOH.

In some embodiments, the silver powder has a mean particle diameter of about 20 µm or less. For example, the silver powder has a mean particle diameter of about 15 µm or less.

In some embodiments, the cathode, the anode, or both comprise a binder, such as any of the binders discussed herein.

In some embodiments, the electrolyte further comprises NaOH.

In some embodiments, the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof. For example, the silver powder comprises AgO, $Ag_2O$, $Ag_2O_3$, or any combination thereof.

In some embodiments, the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

For example, the silicate dopant comprises $K_2SiO_3$, $Si(OC_2H_5)_4$, or any combination thereof.

BRIEF DESCRIPTION OF THE DRAWINGS

FIG. 13 is a plot of life-cycle data for two 125 mAh test cells of Example 6 formed from cathode materials generated using Method M, using a C/5 charge and C/15 discharge.

Figure 1:
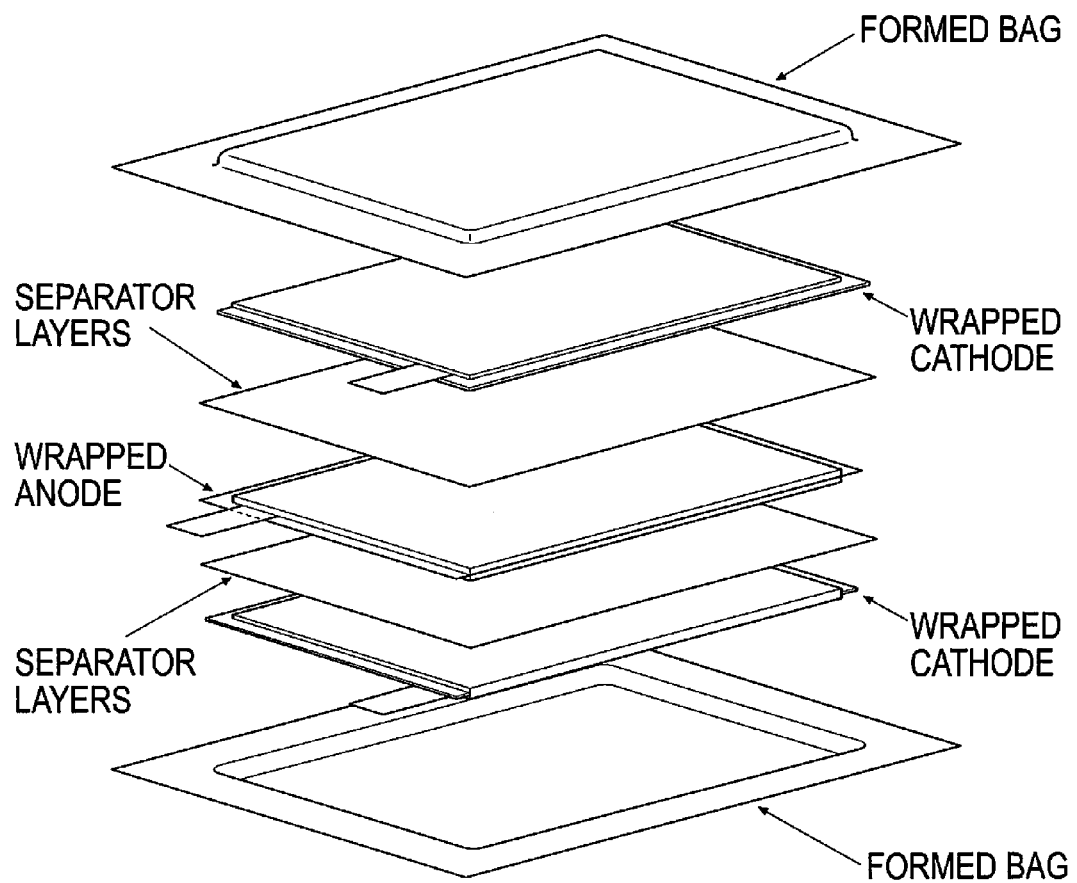
FIG. 1 is an exploded view of an electrochemical cell of the present invention.

These figures are provided by way of example and are not intended to limit the scope of the claimed invention.

DETAILED DESCRIPTION

The present invention provides cathodes, methods of making cathodes, and electrochemical cells (e.g., batteries) that employ these cathodes having improved properties over traditional cathodes, methods, or electrochemical cells.

I. Definitions

As used herein, the term "battery" encompasses electrical storage devices comprising one electrochemical cell or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

As used herein, the terms "silver material" or "silver powder" refer to any silver compound such as Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof. Note that 'hydrates' of silver include hydroxides of silver. Because it is believed that the coordination sphere surrounding a silver atom is dynamic during charging and discharging of the cell wherein the silver serves as a cathode, or when the oxidation state of the silver atom is in a state of flux, it is intended that the term 'silver powder' or 'silver material' encompass any of these silver oxides and hydrates (e.g., hydroxides). Terms 'silver powder' or 'silver material' also includes any of the abovementioned species that are doped and/or coated with dopants and/or coatings that enhance one or more properties of the silver powder or silver material. Example dopants and coatings are provided below. Note that the term "oxide" used herein does not, in each instance, describe the number of oxygen atoms present in the silver or silver material. One generic formula for silver oxide is $AgO_x(OH)_y(H_2O)_z$ wherein x, y, and z are positive real numbers or zero, and at least one of x, y, or z is 1. In other examples, a silver oxide may have a chemical formula of AgO, $Ag_2O_3$, or a combination thereof. Furthermore, silver can comprise a bulk material or silver can comprise a powder having any suitable mean particle diameter.

When used alone, the term "silver" refers to elemental silver.

As used herein, the term "silicate" refers to any compound, material, or dopant (e.g., a dopant for a silver material) or material that includes a silicon anion in its chemical formula. Examples of silicates include compounds having one of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

As used herein, the terms "divalent silver oxide" and "AgO" are used interchangeably.

As used herein, the term "alkaline battery" refers to a primary battery or a secondary battery, wherein the primary or secondary battery comprises an alkaline electrolyte.

As used herein, a "dopant" or "doping agent" refers to a chemical compound that is added to a substance in low concentrations (e.g., from about 0.1 mol % to about 10 mol %) in order to alter the optical/electrical properties of the substance. For example, a dopant may be added to a powder active material of a cathode to improve its electronic properties (e.g., reduce its impedance and/or resistivity or improve a cell's cycle life where the cathode is employed in said cell). In other examples, doping occurs when one or more atoms of a crystal lattice of a bulk material is substituted with one or more atoms of a dopant.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Example electrolytes include, without limitation, aqueous KOH, aqueous NaOH, a mixture of aqueous NaOH and KOH, or the liquid mixture of LiOH, KOH, NaOH, or any combination thereof in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Example alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

A "cycle" or "charge cycle" refers to a consecutive charge and discharge of a cell or a consecutive discharge and charge of a cell, either of which includes the duration between the consecutive charge and discharge or the duration between the consecutive discharge and charge. For example, a cell undergoes one cycle when, freshly prepared, it is discharged to about 100% of its DOD and re-charged to about 100% of its state of charge (SOC). In another example, a freshly prepared cell undergoes 2 cycles when the cell is:
1) Cycle 1: discharged to about 100% of its DOD and re-charged to about 100% SOC; immediately followed by
2) Cycle 2: a second discharge to about 100% of its DOD and re-charged to about 100% SOC.

It is noted that this process may be repeated to subject a cell to as many cycles as is desired or practical.

As used herein, "Ah" refers to Ampere (Amp) Hour and is a scientific unit denoting the capacity of a battery or electrochemical cell. A derivative unit, "mAh" represents a milliamp hour and is $\frac{1}{1000}$ of an Ah.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "state of charge" and "SOC" and used interchangeably to refer to the available capacity remaining in a battery, expressed as a percentage of the cell or battery's rated capacity.

For convenience, the polymer name "polyvinylidene fluoride" and its corresponding initials "PVDF" are used interchangeably to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen or fluorine on the polymer backbone.

For convenience, the polymer name "polytetrafluoroethylene" and its corresponding initials "PTFE" are used interchangeably to distinguish polymers, solutions for preparing polymers, and polymer coatings. Use of these names and initials in no way implies the absence of other constituents. These terms also encompass substituted and co-polymerized polymers. A substituted polymer denotes one for which a substituent group, a methyl group, for example, replaces a hydrogen on the polymer backbone.

As used herein, "organometallic complex" and "complex" refer to complexes or compounds having bonds or binding interactions (e.g., electrostatic interactions) between a metal (e.g., lead or silver) and one or more organic ligands (e.g., nitrate or acetate). Organic ligands often bind the metal through a heteroatom such as oxygen or nitrogen.

Batteries and battery electrodes are denoted with respect to the active materials in the fully-charged state. For example, a zinc-silver battery comprises an anode comprising zinc and a cathode comprising a silver powder (e.g., $Ag_2O_3$). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

As used herein, "maximum voltage" or "rated voltage" refers to the maximum voltage an electrochemical cell can be charged without interfering with the cell's intended utility. For example, in several zinc-silver electrochemical cells that are useful in portable electronic devices, the maximum voltage is less than about 2.5 V (e.g., about 2.3 V or less, or about 2.0 V). In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, Ga, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include Ag, AgO, $Ag_2O_3$, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as Ag, AgO, $Ag_2O_3$ may even be sintered.

Cathodes may also have many configurations. For example, a cathode may be configured from a conductive mesh that is coated with one or more cathode materials. In another example, a cathode may be a solid sheet or bar of cathode material.

As used herein, the term "electronic device" is any device that is powered by electricity. For example, and electronic device can include a portable computer, a portable music player, a cellular phone, a portable video player, hearing aid, or any device that combines the operational features thereof.

As used herein, the term "cycle life" is the maximum number of times a secondary battery can be cycled while retaining a capacity useful for the battery's intended use (e.g., the number of times a cell may be cycled until the cell's 100% SOC, i.e., its actual capacity, is less than 90% of its rated capacity (e.g., less than 85% of its rated capacity, about 90% of its rated capacity, or about 80% of its rated capacity). In some instances, 'cycle life' is the number of times a secondary battery or cell can be cycled until the cell's 100% SOC is at least about 60 percent of its rated capacity (e.g., at least about 70 percent of its rated capacity, at least about 80 percent of its rated capacity, at least 90 percent of its rated capacity, at least 95 percent of its rated capacity, about 90% of its rated capacity, or about 80% of its rated capacity).

As used herein, the symbol "M" denotes molar concentration.

As used herein, the term "oxide" applied to alkaline batteries and alkaline battery electrodes encompasses corresponding "hydroxide" species, which are typically present, at least under some conditions.

As used herein, the term, "powder" refers to a granular solid composed of a plurality of fine particles. In some instances, a powder's granules may flow freely when shaken or tilted, and in other instances, a powder's granules may cohere together, for example, in powders comprising a binder.

As used herein, the term, "mean diameter" or "mean particle diameter" refers to the diameter of a sphere that has the same volume/surface area ratio as a particle of interest.

As used herein, the terms "substantially stable" or "substantially inert" refer to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, "charge profile" refers to a graph of an electrochemical cell's voltage or capacity with time or cycle number. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, "mol %" and "mole percent" are used interchangeably and refer to the amount of dopant present in a cathode or silver material by moles of elemental silver present in the cathode or material.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, the term "nanometer" and "nm" are used interchangeably and refer to a unit of measure equaling $1 \times 10^{-9}$ meters.

As used herein, the term "cathode active material" or "cathode" refer to a composition that includes silver, as described above (e.g., doped silver, coated silver, silver that is doped or coated, or any combination thereof).

As used herein, the term "capacity" refers to the mathematical product of a cell's discharge current and the time (in hours) during which the current is discharged until the cell reaches its terminal voltage.

Similarly, the term "actual capacity" refers to the capacity of the battery or cell when the cell has 100% SOC. In general terms, the capacity of a cell/battery is the amount of charge available expressed in ampere-hours (Ah). An ampere is the unit of measurement used for electrical current and is defined as a coulomb of charge passing through an electrical conductor in one second. The capacity of a cell or battery is related to the quantity of active materials present, the amount of electrolyte present, and the surface area of the electrodes. The capacity of a battery/cell can be measured by discharging at a constant current until it reaches its terminal voltage, which depends on the cell's intended usage.

A cell's "rated capacity" is the capacity that a cell should theoretically discharge at 100% SOC based on the amounts of electrode materials present in the cell, the amount of electrolyte present in the cell, the surface area of the electrodes, and the cell's intended usage. For many types of cells, industry standards establish a cell's rated capacity, which is based on the cell's intended usage.

II. Cathodes

One aspect of the present invention provides a cathode for use in an electrochemical cell comprising a silver material that is doped with a silicate dopant comprising one or more of the following formulae $$X_2SiO_3, \text{ wherein X is Li, Na, K, Rb, Cs, or any combination thereof;} \quad (i)$$

$$YSiO_3, \text{ wherein Y is Be, Mg, Ca, Sr, Ba, or any combination thereof; or} \quad (ii)$$

$$Z_nSi(OR)_m, \text{ wherein Z is a halogen, R is H or a } C_{1-18} \text{ alkyl group, m is 0-4, and n is 4-m,} \quad (iii)$$

wherein the silver material is doped with a concentration of from about 0.01 mol % to about 10 mol % of the silica.

In some embodiments, silver material is doped with a concentration of from about 0.1 mol % to about 5 mol % of silicate dopant. In other embodiments, the silver material is doped with a concentration of from about 0.25 mol % to about 2.5 mol % of silicate dopant. And, in some embodiments, the silver material is doped with a concentration of from about 0.50 mol % to about 1.5 mol % of silicate dopant.

In some embodiments, the doped silver material comprises a powder. Some of these powders have a mean particle diameter of about 20 μm or less. Others have a mean particle diameter of about 15 μm or less.

In some embodiments of this aspect, the silver material comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, or any combination thereof.

In some embodiments, the cathode further comprises a binder. For example, the cathode comprises a binder, and the binder comprises PTFE or PVDF.

In some embodiments, the silicate dopant comprises a silicate of formula (i) $X_2SiO_3$, wherein X is Li, Na, K, Rb, Cs, or any combination thereof. In others, the silicate dopant comprises a silicate of formula (ii) $YSiO_3$, wherein Y is Be, Mg, Ca, Sr, Ba, or any combination thereof. And, in some embodiments, the silicate dopant comprises a silicate of formula (iii) $Z_nSi(OR)_m$, wherein Z is a halogen, R is H or a $C_{1-18}$ alkyl group, m is 0-4, and n is 4-m. For example, the silicate dopant comprises $K_2SiO_3$, or $Si(OC_2H_5)_4$. Examples of silicates that are useful in the present invention include nesosilicates, sorosilicates, cyclosilicates, inosilicates, phyllosilicates, tectosilicates, or any combination thereof.

Another aspect of the present invention provides a cathode for use in an electrochemical cell comprising a silver material that is doped with a silicate dopant comprising one or more of the following formulae $X_2SiO_3$, wherein X is Li, Na, K, Rb, Cs, or any combination thereof; or     (i)

$Z_nSi(OR)_m$, wherein Z is a halogen, R is H or a $C_{1-18}$ alkyl group, m is 0-4, and n is 4-m,     (iii)

wherein the silver material is doped with a concentration of from about 0.01 mol % to about 10 mol % of the silica.

In some embodiment, the silver material is doped with a concentration of from about 0.10 mol % to about 5 mol % of silicate dopant. In others, the silver material is doped with a concentration of from about 0.25 mol % to about 2.5 mol % (e.g., from about 0.50 mol % to about 1.5 mol %) of silicate dopant. And, some alternative cathodes comprise a silver material that is doped with a silicate dopant comprising one or more of the following formulae $X_2SiO_3$, wherein X is Li, Na, K, Rb, Cs, or any combination thereof;     (i)

$YSiO_3$, wherein Y is Be, Mg, Ca, Sr, Ba, or any combination thereof; or     (ii)

$Z_nSi(OR)_m$, wherein Z is a halogen, R is H or a $C_{1-18}$ alkyl group, m is 0-4, and n is 4-m,     (iii)

wherein the silver material is doped with a concentration of from about 50 ppm to about 1000 ppm (e.g., from about 500 ppm to about 5000 ppm) of the silica.

In some embodiments, the doped silver material comprises a powder. Some doped silver powders useful in cathodes of the present invention have a mean particle diameter of about 20 μm or less. Others have a mean particle diameter of about 15 μm or less. And, in some embodiments, the doped silver powder has a mean particle diameter of about 7 μm or less.

In some embodiments, the silver material comprises Ag, AgO, $Ag_2O$, $Ag_2O_3$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, or any combination thereof.

In some embodiments, the cathode further comprises a binder, such as any of the binders described herein.

In some embodiments, the silicate dopant comprises $K_2SiO_3$, $Si(OC_2H_5)_4$, or any combination thereof.

As noted above, cathodes of the present invention can optionally comprise additives such as binders, current collectors, or the like. In several examples, the cathode of the present invention comprises a binder. For instance, the cathode comprises a binder, and the binder comprises PTFE, PVDF (e.g., PVDF-co-HFP), CMC, PVP, PAA, or any copolymer thereof.

In some embodiments, the cathode of the present invention further comprises one or more additional additives such as nanomaterials (e.g., nano-sized $SiO_2$, nano-sized ZnO, nano-sized $ZrO_2$, or any combination thereof), trivalent material (e.g., materials and/or dopants comprising a group 13 element, including any oxide, any hydroxide, any salt, or any combination thereof), high valence materials (e.g., materials and/or dopants comprising one or more elements selected from groups 4-8 in the periodic table, including any oxide, any hydroxide, any salt, or any combination thereof), or any combination thereof. In some instances, the cathode comprises a physical mixture of any combination of these additives along with the silver material. In other instances, the silver is doped with any combination of these additives.

III. Methods

Another aspect of the present invention provides a method of producing a cathode for use in an electrochemical cell comprising providing a silver powder that is doped with from about 0.01 mol % to about 10 mol % of a silicate dopant; and forming the doped silver powder into a cathode.

In some methods, the silver powder is doped with from about 0.10 mol % to about 5 mol % of the silicate dopant. In other methods, the silver powder is doped with from about 0.25 mol % to about 2.5 mol % of the silicate dopant. And, in some methods, the silver powder is doped with from about 0.50 mol % to about 1.5 mol % of the silicate dopant.

In some methods, the doped silver powder has a mean particle diameter of about 20 μm or less. In others, the doped silver powder has a mean particle diameter of about 15 μm or less. And in some embodiments, the doped silver powder has a mean particle diameter of about 7 μm or less.

In some methods, the doped silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, or any combination thereof.

Some methods also include the step of providing a binder, such as any of the binders described herein.

The doped silver powder may undergo further processing such as coating or additional doping.

Some methods of the present invention optionally include the step of adding one or more additional additives to the cathode such as nanomaterials (e.g., nano-sized $SiO_2$, nano-sized ZnO, nano-sized $ZrO_2$, or any combination thereof), trivalent materials (e.g., materials and/or dopants comprising a group 13 element, including any oxide, any hydroxide, any salt, or any combination thereof), high valence materials (e.g., materials and/or dopants comprising one or more elements selected from groups 4-8 in the periodic table, including any oxide, any hydroxide, any salt, or any combination thereof), or any combination thereof. These additives may be added, in any combination, to the cathode to generate a physical mixture with the silver material, or the silver material may be doped with any combination of these additives.

IV. Electrochemical Cells

Another aspect of the present invention provides an electrochemical cell comprising a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof;     (i)

$YSiO_3$, wherein Y is Be, Mg, Ca, Sr, Ba, or any combination thereof; or     (ii)

$Z_nSi(OR)_m$, wherein Z is a halogen, R is H or a $C_{1-18}$ alkyl group, m is 0-4, and n is 4-m,     (iii)

and the silicate dopant is present in a sufficient concentration to impart the cell with an actual capacity of at least about 70% of the cell's rated capacity over at least about 50 cycles (e.g., at least about 150 cycles, at least about 150 cycles, at least about 200 cycles, at least about 250 cycles, at least about 300 cycles, at least about 350 cycles, or at least about 400 cycles).

In some embodiments, the electrochemical cell comprises a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

and the silicate dopant is present in a sufficient concentration to impart the cell with an actual capacity of at least about 70% of the cell's rated capacity over at least about 50 cycles (e.g., at least about 150 cycles, at least about 150 cycles, at least about 200 cycles, at least about 250 cycles, at least about 300 cycles, at least about 350 cycles, or at least about 400 cycles).

In other embodiments, the electrochemical cell comprises a cathode comprising a silver material comprising a silicate dopant; and an anode comprising zinc, wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

and the silicate dopant is present in a sufficient concentration to impart the cell with an actual capacity of at least about 80% of the cell's rated capacity over at least about 50 cycles (e.g., at least about 150 cycles, at least about 150 cycles, at least about 200 cycles, at least about 250 cycles, at least about 300 cycles, at least about 350 cycles, or at least about 400 cycles).

In some of these cells, the silver material comprises from about 0.01 mol % to about 10 mol % (e.g., from about 0.10 mol % to about 5 mol %, from about 0.25 mol % to about 2.5 mol %, or from about 0.50 mol % to about 1.50 mol %) of silicate dopant.

In some of these cells, the silver material comprises a powder. For example, the silver material comprises a powder wherein the powder has a mean particle diameter of about 20 μm or less. In other examples, the powder has a mean particle diameter of about 15 μm or less. And, in some examples, the powder has a mean particle diameter of about 7 μm or less.

In some of these cells, the cathode, the anode, or both comprise a binder. For example, the cathode comprises a binder, such as any of the binders described herein. In other examples, the anode comprises a binder, such as any of the binders described herein.

Some of these cells further comprise an electrolyte comprising NaOH, KOH, or a combination thereof.

In some of these cells, the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, hydrates thereof, or any combination thereof. For example, the silver powder comprises AgO, $Ag_2O$, $Ag_2O_3$, or any combination thereof.

And in some of these cells, the silicate dopant comprises $K_2SiO_3$, $Si(OC_2H_5)_4$, or any combination thereof.

Another aspect of the present invention provides an electrochemical cell comprising a cathode comprising a silver powder comprising from about 0.01 mol % to about 10 mol % of a silicate dopant; an anode comprising zinc; and an electrolyte comprising aqueous KOH.

In some embodiments, the silver powder has a mean particle diameter of about 20 μm or less. For example, the silver powder has a mean particle diameter of about 15 μm or less.

In some embodiments, the cathode, the anode, or both comprise a binder, such as any of the binders discussed herein.

In some embodiments of these aspects, the cell further comprises an electrolyte comprising NaOH, KOH, LiOH, RbOH, or a combination thereof.

In some embodiments, the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, hydrates thereof, or any combination thereof. For example, the silver powder comprises AgO, $Ag_2O$, $Ag_2O_3$, or any combination thereof.

In some embodiments, the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

For example, the silicate dopant comprises $K_2SiO_3$, $Si(OC_2H_5)_4$, or any combination thereof.

A. Electrodes

Cathodes and anodes of electrochemical cells of the present invention can optionally include additives such as a binder, a current collector, or the like. The binder of the cathode and the binder of the anode can include the same material or different materials. In one example, the binder of the anode or the cathode comprises PTFE, PVDF, or any copolymer thereof.

In cathodes comprising a binder, the binder is admixed with the doped silver powder in a suitable concentration (e.g., less than 10 mol % of binder by weight of the cathode, (e.g., 5 mol % or less of binder by weight of the cathode)) and formed into dough-like material that is shaped to provide the cathode with a suitable size and geometry. It is noted that anodes may likewise be produced using a binder.

B. Separators

Electrochemical cells of the present invention additionally comprise a separator that separates the anode from the cathode.

Separators of the present invention can comprise a film having a single layer or a plurality of layers, wherein the plurality of layers may comprise a single polymer (or copolymer) or more than one polymer (or copolymer).

In several embodiments, the separators comprise a unitary structure formed from at least two strata. The separator can include strata wherein each layer comprises the same material, or each layer comprises a different layer, or the strata are layered to provide layers of the same material and at least on layer of another material. In several embodiments, one stratum comprises an oxidation-resistant material, and the remaining stratum comprises a dendrite-resistant material. In other embodiments, at least one stratum comprises an oxidation-resistant material, or at least one stratum comprises a dendrite-resistant material. The unitary structure is formed when the material comprising one stratum (e.g., an oxidation-resistant material) is coextruded with the material comprising another stratum (e.g., a dendrite-resistant material or oxidation-resistant material). In several embodiments, the unitary separator is formed from the coextrusion of oxidation-resistant material with dendrite-resistant material.

In several embodiments, the oxidation-resistant material comprises a polyether polymer mixture and the dendrite resistant material comprises a polyvinyl alcohol (PVA) polymer mixture.

It is noted that separators useful in electrochemical cells can be configured in any suitable way such that the separator is substantially inert in the presence of the anode, cathode and electrolyte of the electrochemical cell. For example, a separator for a rectangular battery electrode may be in the form of a sheet or film comparable in size or slightly larger than the electrode, and may simply be placed on the electrode or may be sealed around the edges. The edges of the separator may be sealed to the electrode, an electrode current collector, a battery case, or another separator sheet or film on the backside of the electrode via an adhesive sealant, a gasket, or fusion (heat sealing) of the separator or another material. The separator may also be in the form of a sheet or film wrapped and folded around the electrode to form a single layer (front and back), an overlapping layer, or multiple layers. For a cylindrical battery, the separator may be spirally wound with the electrodes in a jelly-roll configuration. Typically, the separator is included in an electrode stack comprising a plurality of separators. The oxidation-resistant separator of the invention may be incorporated in a battery in any suitable configuration 1. Polyether Polymer Material In several embodiments of the present invention the oxidation-resistant stratum of the separator comprises a polyether polymer material that is coextruded with a dendrite-resistant material. The polyether material can comprise polyethylene oxide (PEO) or polypropylene oxide (PPO), or a copolymer or a mixture thereof. The polyether material may also be copolymerized or mixed with one or more other polymer materials, polyethylene, polypropylene and/or polytetrafluoroethylene (PTFE), for example. In some embodiments, the PE material is capable of forming a free-standing polyether film when extruded alone, or can form a free-standing film when coextruded with a dendrite-resistant material. Furthermore, the polyether material is substantially inert in the alkaline battery electrolyte and in the presence of silver ions.

In alternative embodiments, the oxidation resistant material comprises a PE mixture that optionally includes zirconium oxide powder. Without intending to be limited by theory, it is theorized that the zirconium oxide powder inhibits silver ion transport by forming a surface complex with silver ions. The term "zirconium oxide" encompasses any oxide of zirconium, including zirconium dioxide and yttria-stabilized zirconium oxide. The zirconium oxide powder is dispersed throughout the PE material so as to provide a substantially uniform silver complexation and a uniform barrier to transport of silver ions. In several embodiments, the average particle size of the zirconium oxide powder is in the range from about 1 nm to about 5000 nm, e.g., from about 5 nm to about 100 nm.

In other embodiments, the oxidation-resistant material further comprises an optional conductivity enhancer. The conductivity enhancer can comprise an inorganic compound, potassium titanate, for example, or an organic material. Titanates of other alkali metals than potassium may be used. Suitable organic conductivity enhancing materials include organic sulfonates and carboxylates. Such organic compounds of sulfonic and carboxylic acids, which may be used singly or in combination, comprise a wide range of polymer materials that may include salts formed with a wide variety of electropositive cations, $K^+$, $Na^+$, $Li^+$, $Pb^{+2}$, $Ag^+$, $NH4^+$, $Ba^{+2}$, $Sr^{+2}$, $Mg^{+2}$, $Ca^{+2}$ or anilinium, for example. These compounds also include commercial perfluorinated sulfonic acid polymer materials, Nafion® and Flemion®, for example. The conductivity enhancer may include a sulfonate or carboxylate copolymer, with polyvinyl alcohol, for example, or a polymer having a 2-acrylamido-2-methyl propanyl as a functional group. A combination of one or more conductivity enhancing materials can be used.

Oxidation-resistant material that is coextruded to form a separator of the present invention can comprise from about 5 wt % to about 95 wt % (e.g., from about 20 wt % to about 60 wt %, or from about 30 wt % to about 50 wt %) of zirconium oxide and/or conductivity enhancer. In some embodiments, the zirconium oxide comprises a small amount (e.g., less than 5 mol %) of yttria (i.e., yttrium oxide).

Oxidation-resistant materials can also comprise additives such as surfactants that improve dispersion of the zirconium oxide powder by preventing agglomeration of small particles. Any suitable surfactant may be used, including one or more anionic, cationic, non-ionic, ampholytic, amphoteric and zwitterionic surfactants, and mixtures thereof. In one embodiment, the separator comprises an anionic surfactant. For example, the separator comprises an anionic surfactant, and the anionic surfactant comprises a salt of sulfate, a salt of sulfonate, a salt of carboxylate, or a salt of sarcosinate. One useful surfactant comprises p-(1,1,3,3-tetramethylbutyl)-phenyl ether, which is commercially available under the trade name Triton X-100 from Rohm and Haas.

In several embodiments, the oxidation-resistant material comprises from about 0.01 wt % to about 1 wt % of surfactant.

2. Polyvinyl Polymer Material

In several embodiments of the present invention the dendrite-resistant stratum of the separator comprises a polyvinyl alcohol (PVA) polymer material that is coextruded with the oxidation-resistant material. In several embodiments, the PVA material comprises a cross-linked polyvinyl alcohol polymer and a cross-linking agent.

In several embodiments, the cross-linked polyvinyl alcohol polymer is a copolymer. For example, the cross-linked PVA polymer is a copolymer comprising a first monomer, PVA, and a second monomer. In some instances, the PVA polymer is a copolymer comprising at least 60 mole percent of PVA and a second monomer. In other examples, the second monomer comprises vinyl acetate, ethylene, vinyl butyral, or any combination thereof.

PVA material useful in separators of the present invention also comprise a cross-linking agent in a sufficient quantity as to render the separator substantially insoluble in water. In several embodiments, the cross-linking agent used in the separators of the present invention comprises a monoaldehyde (e.g., formaldehyde or glyoxilic acid); aliphatic, furyl or aryl dialdehydes (e.g., glutaraldehyde, 2,6 furyldialdehyde or terephthaldehyde); dicarboxylic acids (e.g., oxalic acid or succinic acid); polyisocyanates; methylolmelamine;

copolymers of styrene and maleic anhydride; germaic acid and its salts; boron compounds (e.g., boron oxide, boric acid or its salts; or metaboric acid or its salts); or salts of copper, zinc, aluminum or titanium. For example, the cross-linking agent comprises boric acid.

In another embodiment, the PVA material optionally comprises zirconium oxide powder. In several embodiments, the PVA material comprises from about 1 wt % to about 99 wt % (e.g., from about 2 wt % to about 98 wt %, from about 20 wt % to about 60 wt %, or from about 30 wt % to about 50 wt %).

In many embodiments, the dendrite-resistant strata of the separator of the present invention comprises a reduced ionic conductivity. For example, in several embodiments, the separator comprises an ionic resistance of less than about 20 m$\Omega$/cm$^2$, (e.g., less than about 10 m$\Omega$/cm$^2$, less than about 5 m$\Omega$/cm$^2$, or less than about 4 m$\Omega$/cm$^2$).

The PVA material that forms the dendrite-resistant stratum of the separator of the present invention can optionally comprise any suitable additives such as a conductivity enhancer, a surfactant, a plasticizer, or the like.

In some embodiments, the PVA material further comprises a conductivity enhancer. For example, the PVA material comprises a cross-linked polyvinyl alcohol polymer, a zirconium oxide powder, and a conductivity enhancer. The conductivity enhancer comprises a copolymer of polyvinyl alcohol and a hydroxyl-conducting polymer. Suitable hydroxyl-conducting polymers have functional groups that facilitate migration of hydroxyl ions. In some examples, the hydroxyl-conducting polymer comprises polyacrylate, polylactone, polysulfonate, polycarboxylate, polysulfate, polysarconate, polyamide, polyamidosulfonate, or any combination thereof. A solution containing a copolymer of a polyvinyl alcohol and a polylactone is sold commercially under the trade name Vytek® polymer by Celanese, Inc. In several examples, the separator comprises from about 1 wt % to about 10 wt % of conductivity enhancer.

In other embodiments, the PVA material further comprises a surfactant. For example, the separator comprises a cross-linked polyvinyl alcohol polymer, a zirconium oxide powder, and a surfactant. The surfactant comprises one or more surfactants selected from an anionic surfactant, a cationic surfactant, a nonionic surfactant, an ampholytic surfactant, an amphoteric surfactant, and a zwitterionic surfactant. Such surfactants are commercially available. In several examples, the PVA material comprises from about 0.01 wt % to about 1 wt % of surfactant.

In several embodiments, the dendrite-resistant stratum further comprises a plasticizer. For example, the dendrite-resistant stratum comprises a cross-linked polyvinyl alcohol polymer, a zirconium oxide powder, and a plasticizer. The plasticizer comprises one or more plasticizers selected from glycerin, low-molecular-weight polyethylene glycols, aminoalcohols, polypropylene glycols, 1,3 pentanediol branched analogs, 1,3 pentanediol, and/or water. For example, the plasticizer comprises greater than about 1 wt % of glycerin, low-molecular-weight polyethylene glycols, aminoalcohols, polypropylene glycols, 1,3 pentanediol branched analogs, 1,3 pentanediol, or any combination thereof, and less than 99 wt % of water. In other examples, the plasticizer comprises from about 1 wt % to about 10 wt % of glycerin, low-molecular-weight polyethylene glycols, aminoalcohols, polypropylene glycols, 1,3 pentanediol branched analogs, 1,3 pentanediol, or any combination thereof, and from about 99 wt % to about 90 wt % of water.

In some embodiments, the separator of the present invention further comprises a plasticizer. In other examples, the plasticizer comprises glycerin, a low-molecular-weight polyethylene glycol, an aminoalcohol, a polypropylene glycols, a 1,3 pentanediol branched analog, 1,3 pentanediol, or combinations thereof, and/or water.

C. Electrolytes

Electrochemical cells of the present invention can comprise any suitable electrolyte. For example, the electrochemical cell comprises an electrolyte that includes aqueous NaOH or KOH. In other examples, the electrolyte comprises a mixture of LiOH, RbOH, NaOH or KOH and a liquid PEO polymer.

Electrolytes that are suited to electrochemical cells of the present invention include an alkaline agent. Example electrolytes include aqueous metal-hydroxides such as aq. NaOH and/or aq. KOH, or combinations thereof. Other example electrolytes include aqueous mixtures of metal hydroxide and a polymer that has a glass transition temperature below the range of operating and/or storage temperatures for the electrochemical cell into which it employed (e.g. at least −20° C.).

In one embodiment, the electrolyte comprises PEG, such as mPEG. In some embodiments, the PEG polymer has a molecular weight or mean molecular weight of less than about 10,000 amu (e.g., less than about 5000 amu, or from about 100 amu to about 1000 amu).

Alkaline agents useful in the electrolyte of the present invention are capable of producing hydroxyl ions when mixed with an aqueous or polar solvent such as water and/or a liquid polymer.

In some embodiments, the alkaline agent comprises LiOH, NaOH, KOH, CsOH, RbOH, or combinations thereof. For example, the alkaline agent comprises LiOH, NaOH, KOH, or combinations thereof. In another example, the alkaline agent comprises KOH.

In several example embodiments, the electrolyte of the present invention comprises more than about 1 wt % of alkaline agent (e.g., more than about 5 wt % of alkaline agent, or from about 5 wt % to about 76 wt % of alkaline agent). In one example, the electrolyte comprises a liquid polymer comprising PEG and 3 wt % or more (e.g., 4 wt % or more, from about 4 wt % to about 33 wt %, or from about 5 wt % to about 15 wt %) of an alkaline agent. For instance, the electrolyte comprises PEG and 5 wt % or more of KOH. In another example, the electrolyte consists essentially of water, PEG (e.g., mPEG) having a molecular weight or mean molecular weight from about 100 amu to about 1000 amu, and 5 wt % or more of KOH.

In several embodiments, the electrolyte comprises greater than 60 wt % of water by weight of the electrolyte. Additionally, electrolytes of the present invention may optionally comprise less than about 10 wt % by weight of electrolyte (e.g., less than about 5 mol % by weight of electrolyte or less than about 1 mol % by weight of electrolyte) of a small carbon chain alcohol such as methanol, ethanol, isopropanol, or mixtures thereof.

In some examples, the electrolyte is aqueous KOH. For instance, 8M KOH, 12M KOH, or the like.

In other examples, the electrolyte is aqueous NaOH. For instance, 8M NaOH, 12M NaOH, or the like.

D. Cell Housing

Cells of the present invention can include any suitable housing such that the housing does not substantially impede electrical access to the terminals of the cell. In some embodiments, the cell housing comprises flexible packaging material. Usually, the flexible packaging material is used in a sachet configuration or a drawn cavity configuration. Unlike traditional applications of flexible packaging battery packaging requires feed through to carry the current from the enclosed electrochemical cell. Insulating and sealing these feed-throughs can be done by a number of methods. Typically, the flexible packaging material consists of three functional layers, which can be embodied in three physical layer or less (e.g., in some packaging materials, the physical layers perform one, two, or three of the functions performed by functional layers). The first functional layer is an electrolyte-compatible layer. This layer provides chemical resistance and physical containment of the liquid or gelatinous electrolyte. Typically this layer can consist of a polyolefin or polyethylvinyl alcohol that may be co-extruded or mixed with an adhesion promoter, ethyl acrylic acid for example, to facilitate heat sealing or current feed-through adhesion. The second functional layer is a vapor barrier layer. This layer can be a metal, aluminum, or a low transmissibility polymer. This functional layer needs to retard the diffusion of water, electrolyte solvent, oxygen, hydrogen, and carbon dioxide into the cell. The third functional layer provides a physical integrity layer on the outside of the packaging. It provides much of the packaging material's strength and abrasion resistance. This layer may also provide the physical strength to allow the packaging material to be formed into blisters. This layer is typically nylon or mylar in its composition. The functional layer materials can also be applied as conformal coatings to the cells by dip coating or spraying. Cells packaged in flexible packaging typically contain a reduced pressure atmosphere with the absolute pressure inside less than ambient pressure.

V. Examples

The following materials may be used to produce example cathodes, test cathodes, and/or example electrochemical cells of the present invention:

Example No. 1: Doped AgO

The following materials and methods were used to generate doped AgO cathode material that was used in test cells for purposes of generating comparative data concerning cell performance characteristics, i.e., cell cycle life.

Materials:
Silver nitrate: A.C.S. grade, DFG
Gelatin: from bovine skin, type B, ~225 bloom, Sigma
Potassium hydroxide solution: KOH solution, 1.4 g/ml, LabChem., Inc.
Potassium persulfate, 99+%, Sigma-Aldrich Method A In a 2 L glass reactor, added $AgNO_3$ (116.7 g) to $H_2O$ (1000 g) at 55° C. while stirring with an overhead mechanical stirrer at 400 rpm. Then added a $H_2O$ (200 g) suspension of three nano-materials: 1.] $SiO_2$ (13 mg), 2.] ZnO (24 mg), and 3.] $ZrO_2$ (120 mg). After adding the silicate (e.g., $K_2SiO_3$ (1.0706 g)), gelatin (0.11 g) was then added to the stirred solution. After allowing to stir at 55° C. for 10 min, a mixture of 40% wt KOH (260 g, aq.) and $H_2O$ (260 g) was pumped in at a rate of 17.5 g/min using size 16 master-flex tubing for 20 min. The temperature of the glass reactor was then increased to 65° C. $K_2S_2O_3$ (198 g) was then added to the reactor all at once immediately upon reaching 65° C. The reaction was allowed to stir at 65° C. for 50 min. Upon cooling, the solution was decanted and the solid black particles were then washed with $H_2O$ (2 L×8) until the conductivity of the wash was less than 20 µS. [Note: the silicate can be added either dry (neat) or dissolved/mixed in an aqueous or alcoholic solution]

Method B

Referring to Method A, the silicate is instead introduced by first dissolution in the mixture of 40% wt KOH (260 g, aq.) and $H_2O$ (260 g) and then added together to the silver nitrate containing reaction mixture.

Method C

Referring to Method A, the silicate is instead introduced by first dissolution in the mixture of 40% wt KOH (260 g, aq.) and $H_2O$ (260 g) and then added together to the silver nitrate containing reaction mixture. The nano-materials are not added.

Method D

Referring to Method A, the silicate is instead introduced by first dissolution in the mixture of 40% wt KOH (260 g, aq.) and $H_2O$ (260 g) and then added together to the silver nitrate containing reaction mixture. The nano-materials are not added. The addition of the aqueous mixture of $K_2SiO_3$ and 40% wt KOH to the silver nitrate is conducted in thirds with a mixing time of 24 hours in between each addition and before oxidation with $K_2S_2O_3$ in order to grow and obtain larger particle sizes.

Method E

Referring to Method A, the silicate is instead introduced by first dissolution in the mixture of 40% wt KOH (260 g, aq.) and $H_2O$ (260 g) and then added together to the silver nitrate containing reaction mixture. The addition of the aqueous mixture of $K_2SiO_3$ and 40% wt KOH to the silver nitrate is conducted in thirds with a mixing time of 24 hours in between each addition and before oxidation with $K_2S_2O_3$ in order to grow and obtain larger particle sizes.

Method F

Referring to Method A, the nano-materials are not added.

Method G

Referring to Method A, the silicate is added to the water in the reactor before the silver nitrate.

Method H

Referring to Method A, the silicate is added to the water in the reactor before the silver nitrate. The nano-materials are not added.

Method I

Referring to Method A, the silicate is added after the KOH.

Method J

Referring to Method A, the silicate is added after the KOH. The nano-materials are not added.

Method K

Referring to Method A and Example No. 2, below, the silicate is added before the lead nitrate in the coating process described below.

Method L

Referring to Method A and Example No. 2, below, the silicate is added after the lead nitrate in the coating process described below.

Method M

Referring to Method A and Example No. 3, below, the silicate is added with the PTFE emulsion during the cathode preparation described below.

Method N

Referring to Method A and Example No. 3, below, the silicate is added before the PTFE emulsion during the cathode preparation described below.

Method O

Referring to Method A and Example No. 3, below, the silicate is added after the PTFE emulsion during the cathode preparation described below.

Method P

Referring to Method A and Example Nos. 2 and 3, below, the silicate addition is portioned into multiple steps to include a combination of the doping, coating, and cathode preparation steps.

TABLE 1

List of the type, degree, and method of silicate doping of the AgO cathode materials and physical properties of batches synthesized.

| Dopant | Conc. (mol %) | Activity (%) | Particle Size (μm) | | | Method | TAP Density (g/ml) |
|---|---|---|---|---|---|---|---|
| | | | D10 | D50 | D95 | | |
| K$_2$SiO$_3$ | 8.6 | N/A | 1.38 | 4.34 | 9.88 | D | N/A |
| K$_2$SiO$_3$ | 5.9 | 60.4 | 1.13 | 10.47 | 76.7 | D | N/A |
| K$_2$SiO$_3$ | 2.3 | 73 | 4.93 | 9.58 | 31.49 | C | 0.53 |
| K$_2$SiO$_3$ | 4.5 | 78 | 0.41 | 4.06 | 34.70 | C | 0.53 |
| K$_2$SiO$_3$ | 1.5 | 77 | 0.42 | 4.60 | 12.6 | D | 0.60 |
| K$_2$SiO$_3$ | 4.5 | 81 | 0.40 | 2.80 | 22.6 | C | 0.50 |
| K$_2$SiO$_3$ | 0.9 | 93 | 0.41 | 1.74 | 6.91 | C | 0.55 |
| Si(OC$_2$H$_5$)$_4$ | 1.0 | 97.5 | 0.61 | 1.89 | 4.91 | M | 1.47 |
| K$_2$SiO$_3$ | 0.4 | 95 | 0.43 | 1.23 | 2.67 | B | 1.48 |
| K$_2$SiO$_3$ | 1.0 | 92.9 | 0.44 | 1.44 | 4.12 | A | 0.49 |

Example No. 2: Coating of Doped AgO

An H$_2$O (850) solution of doped AgO (85 g) was stirred at 400 rpm with an overhead stirrer in a 2 L flask. A solution of Pb(CH$_3$CO$_2$)$_2$×3H$_2$O (3.315 g) in H$_2$O (100 g) was then pumped into the flask at a rate of 3.33 g/min using size 14 master-flex tubing for 60 min at room temperature. Upon completion of the addition, the solution was decanted away from the black solid which was then rinse with H$_2$O (4 L×8) until the conductivity of the wash was less than 20 μS. The black precipitate was then collected via filtration and then dried overnight under vacuum at 60° C.

Example No. 3: Cathode Preparation A

A PTFE emulsion (6.4% wt. in H$_2$O, DuPont) was sprayed on to dry AgO (73 g) and mixed thoroughly and then fibrillated with a Speed Mixer (DAC 150 FVZ, FlackTek Inc). The wet AgO dough was rolled out to a thickness of (2 mm) before being placed into an oven at 60° C. and dried in vacuo for three hours. The dried AgO cathode dough was additionally rolled down to a thickness of 0.9 mm and cut into 15.5 mm diameter disks.

Example No. 4: Undoped AgO

A 2 L Aceglass reactor was placed into a hot water bath and a Teflon-coated radial propeller was used. A total of 116.7 g of AgNO$_3$ and 1000 g of DI water were added to the reactor and stirred at 400 rpm. The mixture in the reactor was heated to 55° C. 0.11 g gelatin was added.

In a plastic container, 240 g of KOH solution (1.4 g/ml) was mixed with 240 g DI water to give a diluted KOH solution. The diluted KOH solution was added to the reactor per pump at 55° C. At 65° C., 198 g of potassium persulfate was added and the temperature was maintained for 50 min.

The water was decanted as the solution cooled down and the particles settled. The particles were rinsed with DI water, and once the particles settled, the water was decanted. The particles underwent this rinse and decant process until the ion conductivity of the mixture measured below 25 micro-Ohm. The product was filtered and dried in a 60° C. vacuum oven.

The resultant undoped AgO cathode material is characterized below in Table 2.

TABLE 2

| Undoped AgO cathodes. | | | | |
|---|---|---|---|---|
| Cathode Formulation | Activity | Resistivity (Ohm · cm) | Particle Size (μm) | | |
| | | | D10 | D50 | D95 |
| Undoped AgO | >95 | 24 | 0.41 | 1.44 | 3.4 |

The activity of cathode materials described in Tables 1 and 2 was measured by titration:

A sample was crushed with a spatula. If sample was not completely dry, it was dried in a vacuum oven at 60° C. overnight. A total of 0.100 g of sample was added to a clean 125 ml flask, wherein the weight was measured accurately to at least the third decimal place. Next, 10 ml of acetate buffer and 5 ml KI solution was added to the flask. The flask was swirled to disperse particles followed by covering the flask by putting an inverted plastic cup over top, and sonicating for 2 hours. Next, 20 ml of DI was added to the flask. The solution was titrated with Na$_2$S$_2$O$_3$ until the solution achieved a pale yellow (record exact normality). Approximately 1 ml of starch indicator was added and titration continued until the solution achieved a milky whitish-yellow endpoint.

The following equation was used to calculate activity:

$$\text{Activity} = \frac{(vol.\ \text{titrant}\ (mls)) \times (\text{normality titrant}) \times 12.388}{(\text{mass of silver material (g)})}$$

Particle size analysis was performed using a Horiba LA-930. Diameters on 10%, 50%, and 95% (D10, D50, and D95) were measured for the samples provided above.

The resistivities of this cathode materials were measured using the following procedure: 3 grams of sample material was loaded into a powder compression cell with a 3.88 cm$^2$ electrode surface area. Force was applied to the sample from 10 to 40 tons by using a laboratory hydraulic press. The resistance was recorded every 5 tons and the thickness of the sample at 40 tons is also recorded. The resistivity of the sample is the resistance value extrapolated to infinite force divided by final material thickness and multiplied by the area of the powder cell electrodes.

Example No. 5: Cathode Preparation B 42.1 g of a PTFE emulsion (6.4% wt. in H$_2$O, DuPont) was diluted with H$_2$O (366.0 g) and then sprayed on to dry AgO (73 g) and mixed thoroughly and then fibrillated with a Speed Mixer (DAC 150 FVZ, FlackTek Inc). The wet AgO dough was rolled out to a thickness of (2 mm) before being placed into an oven at 60° C. and dried in vacuo for 15 hours. The dried AgO cathode dough was then ground into a coarse powder. The AgO powder (0.73 g) was then placed into a 15.5 mm diameter circular powder press fixture and subjected to 15 tons of pressure resulting in a thickness of 0.9 mm.

Example No. 6: Test Cells

Figure 2:
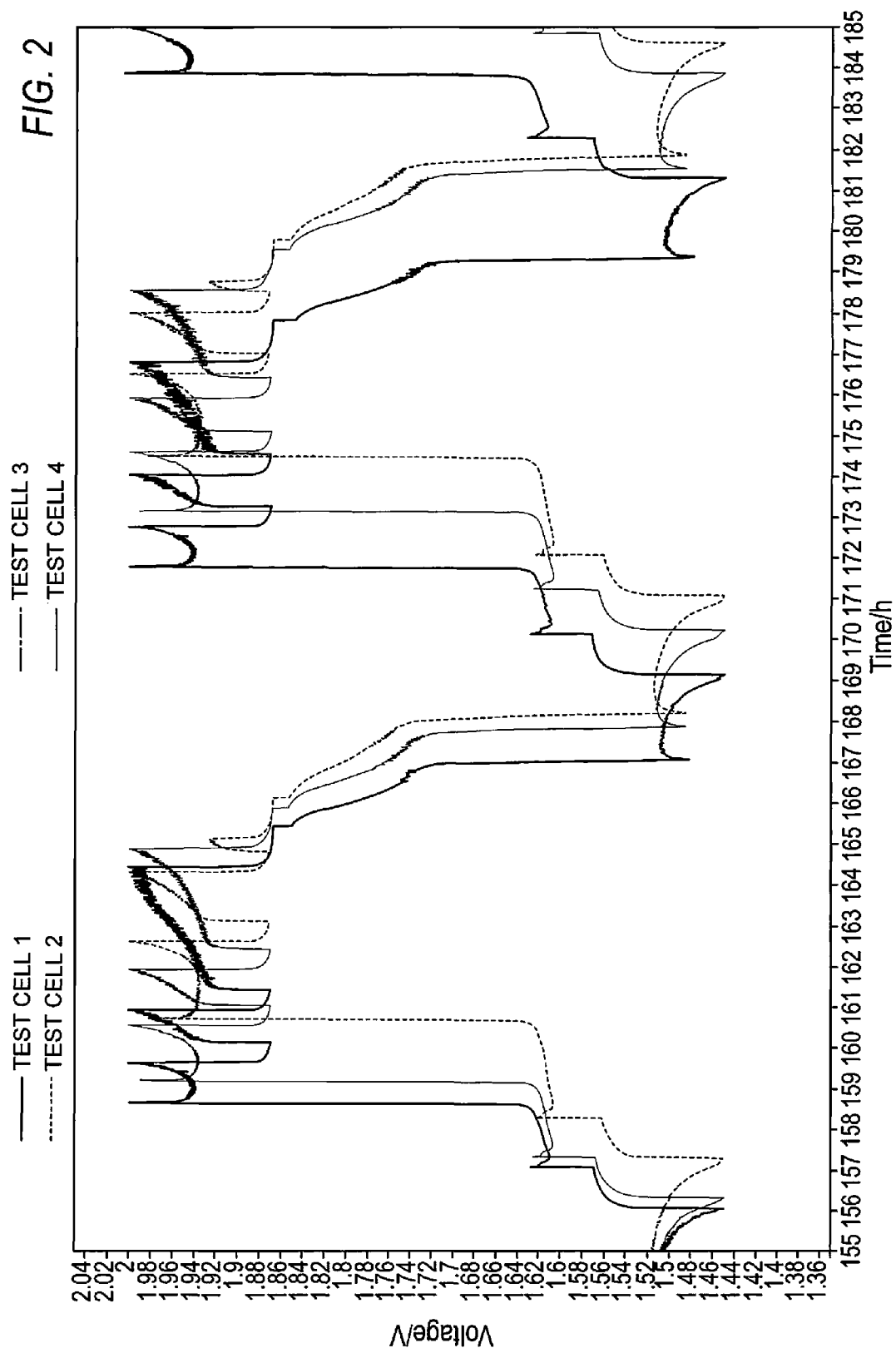
FIG. 2 is a plot of voltage data from four 40 mAh test cells of Example 6 formed from cathode materials generated using Method D, using a C/5 charge and C/5 discharge.
Figure 3:
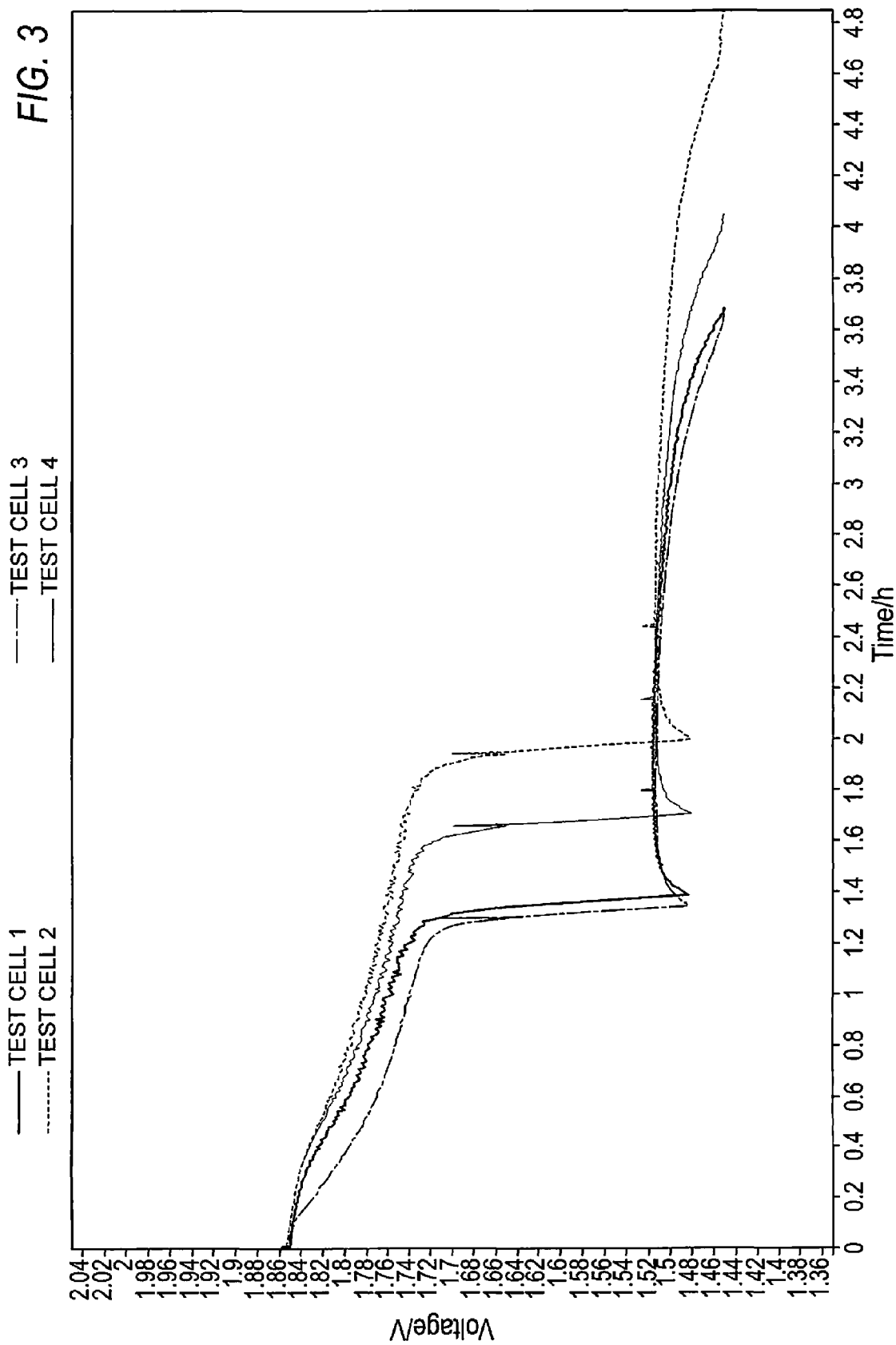
FIG. 3 is a plot of voltage data from a single discharge from four 40 mAh test cells of Example 6 formed from cathode materials generated using Method D, using a C/5 discharge.
Figure 4:
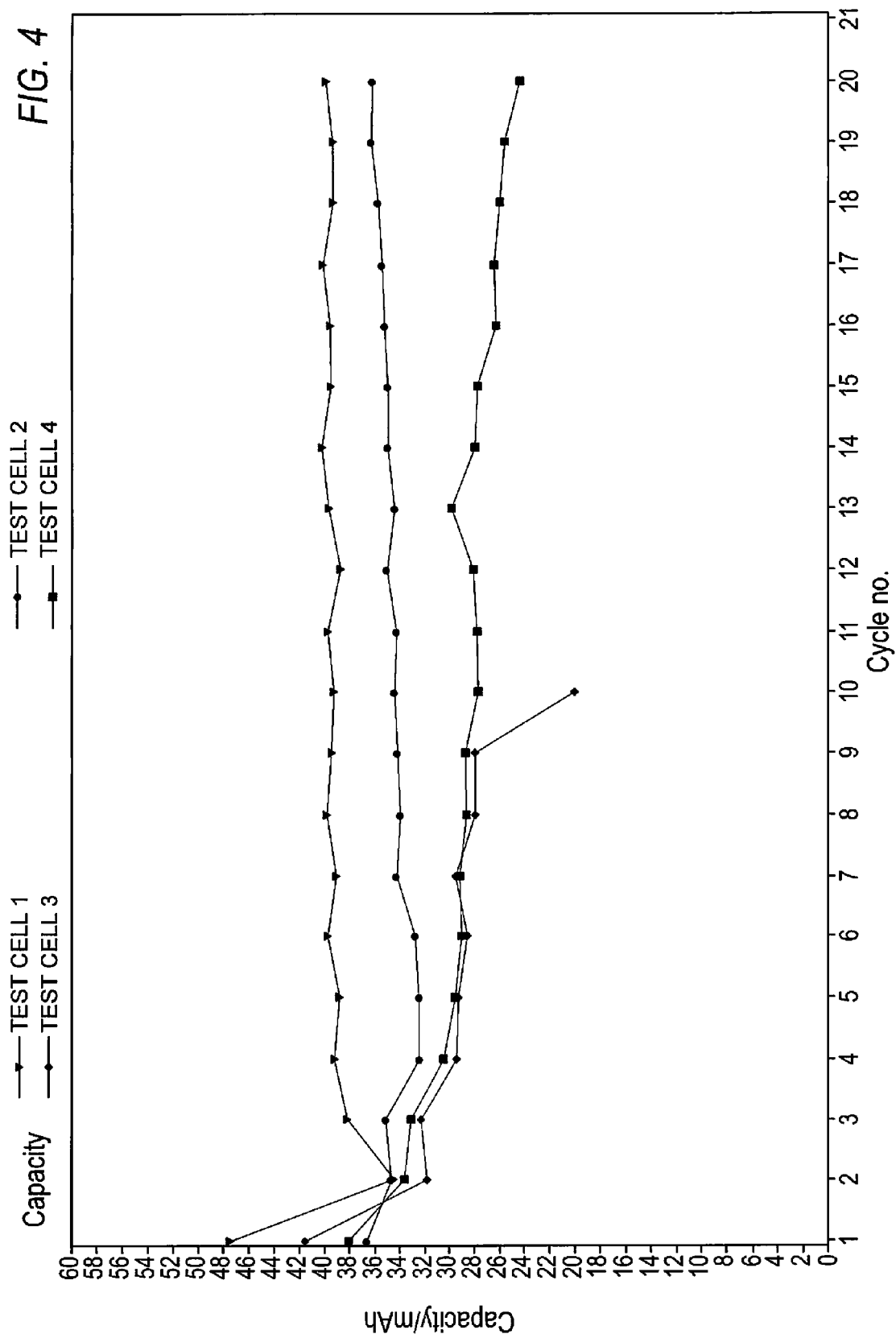
FIG. 4 is a plot of life-cycle data for four 40 mAh test cells of Example 6 formed from cathode materials generated using Method D, using a C/5 charge and C/5 discharge.
Figure 5:
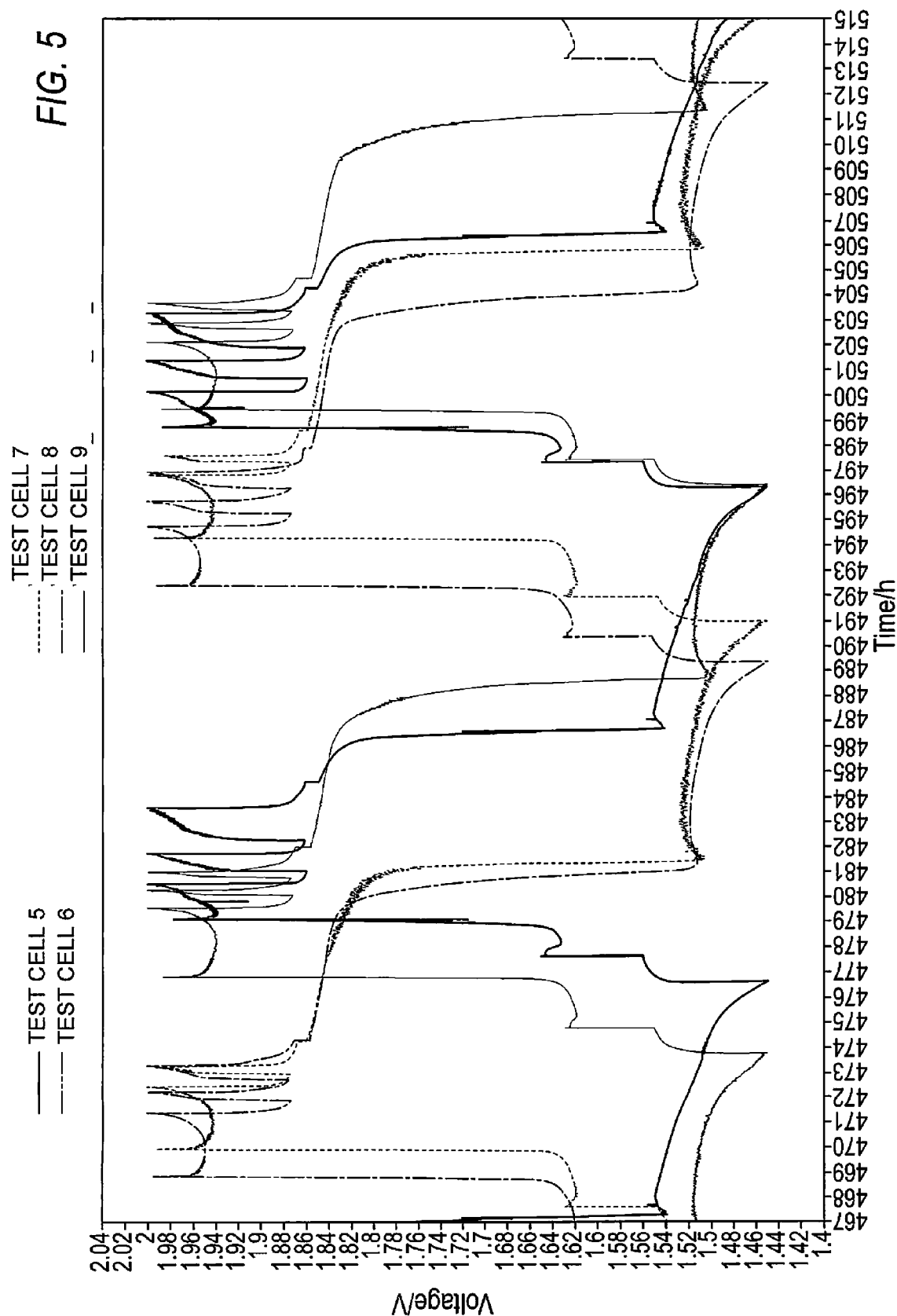
FIG. 5 is a plot of voltage data from five 40 mAh test cells of Example 6 formed from cathode materials generated using Method D, using a C/5 charge and C/15 discharge.
Figure 6:
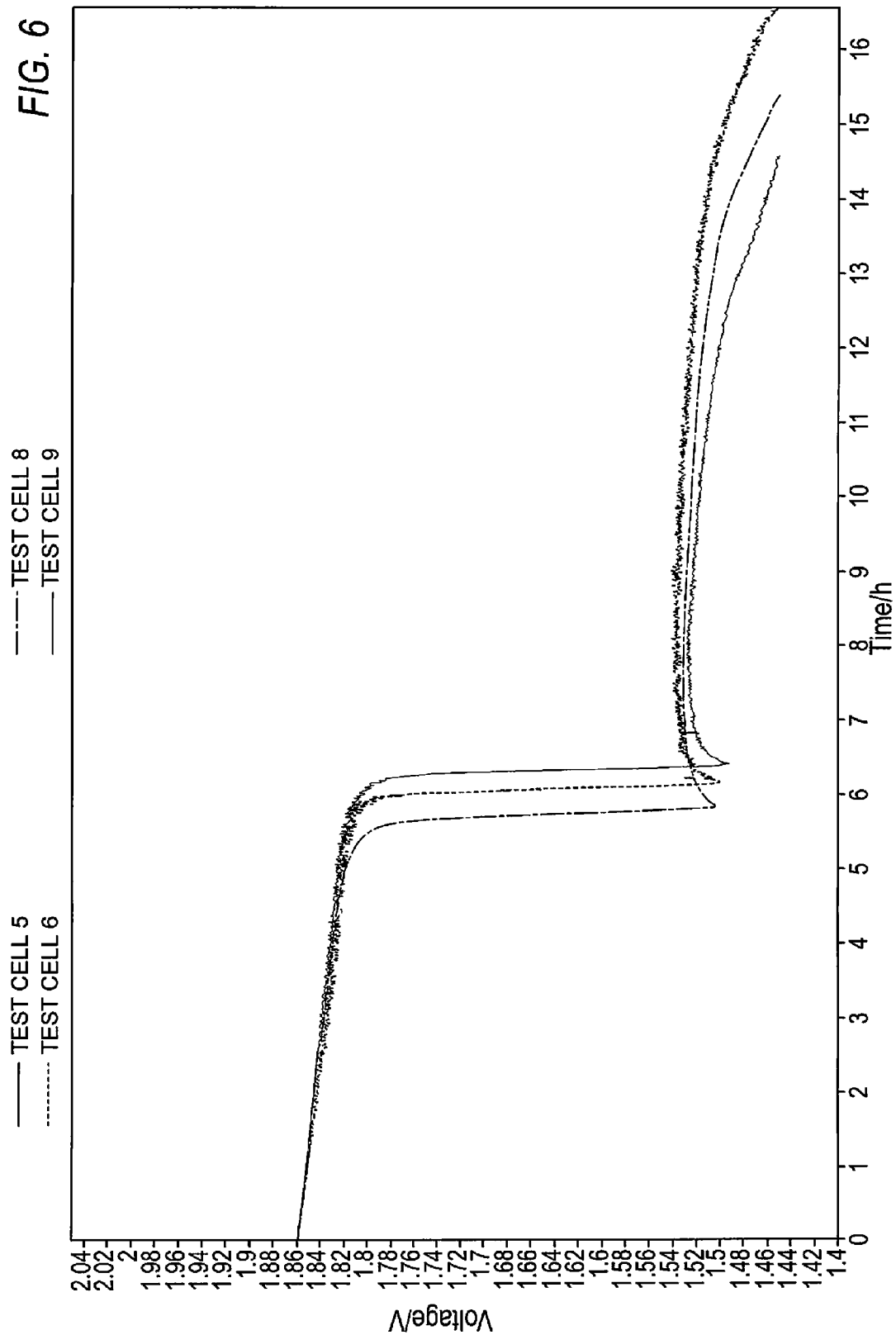
FIG. 6 is a plot of voltage data from a single discharge from four 40 mAh test cells of Example 6 formed from cathode materials generated using Method D, using a C/15 discharge.
Figure 7:
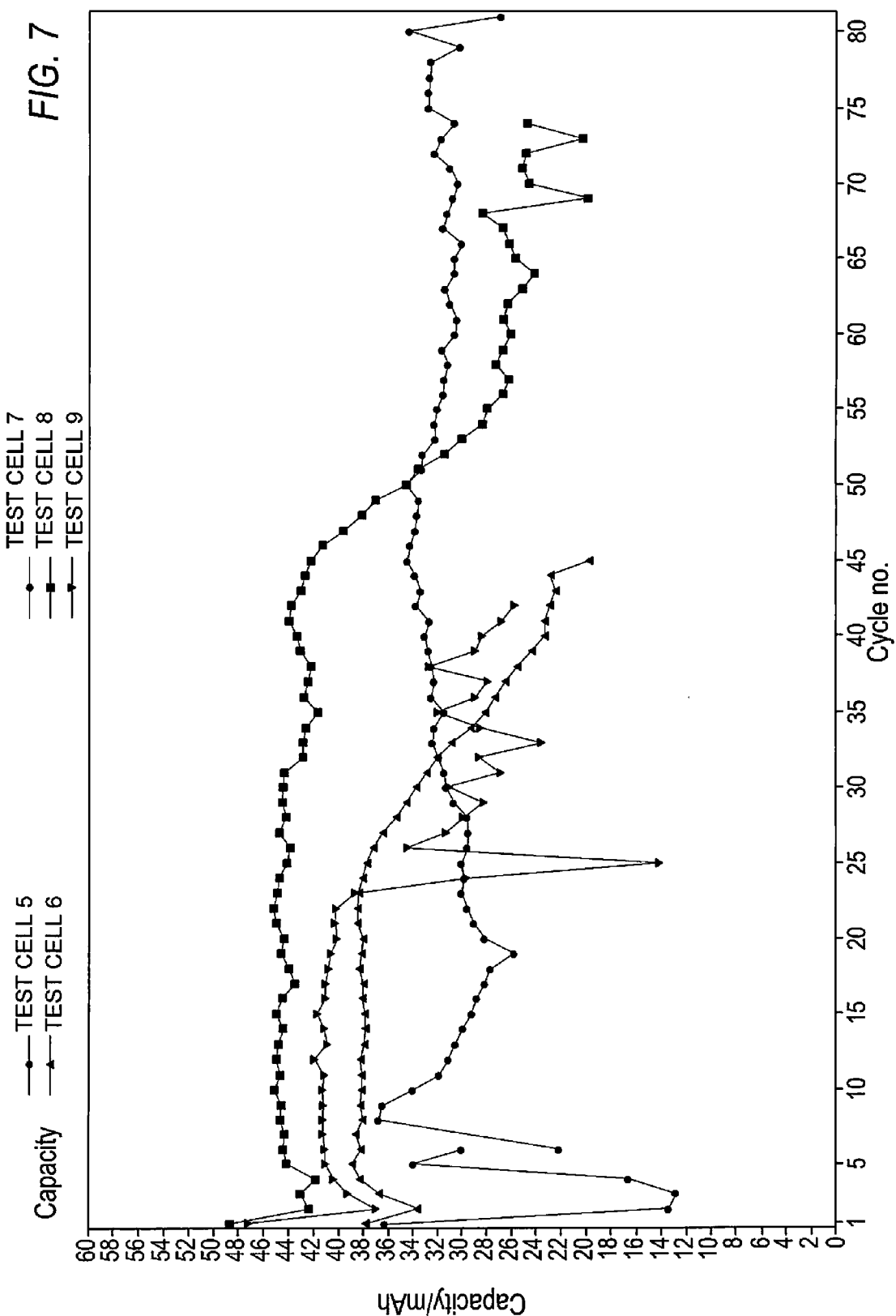
FIG. 7 is a plot of life-cycle data for five 40 mAh test cells of Example 6 formed from cathode materials generated using Method D, using a C/5 charge and C/15 discharge.
Figure 8:
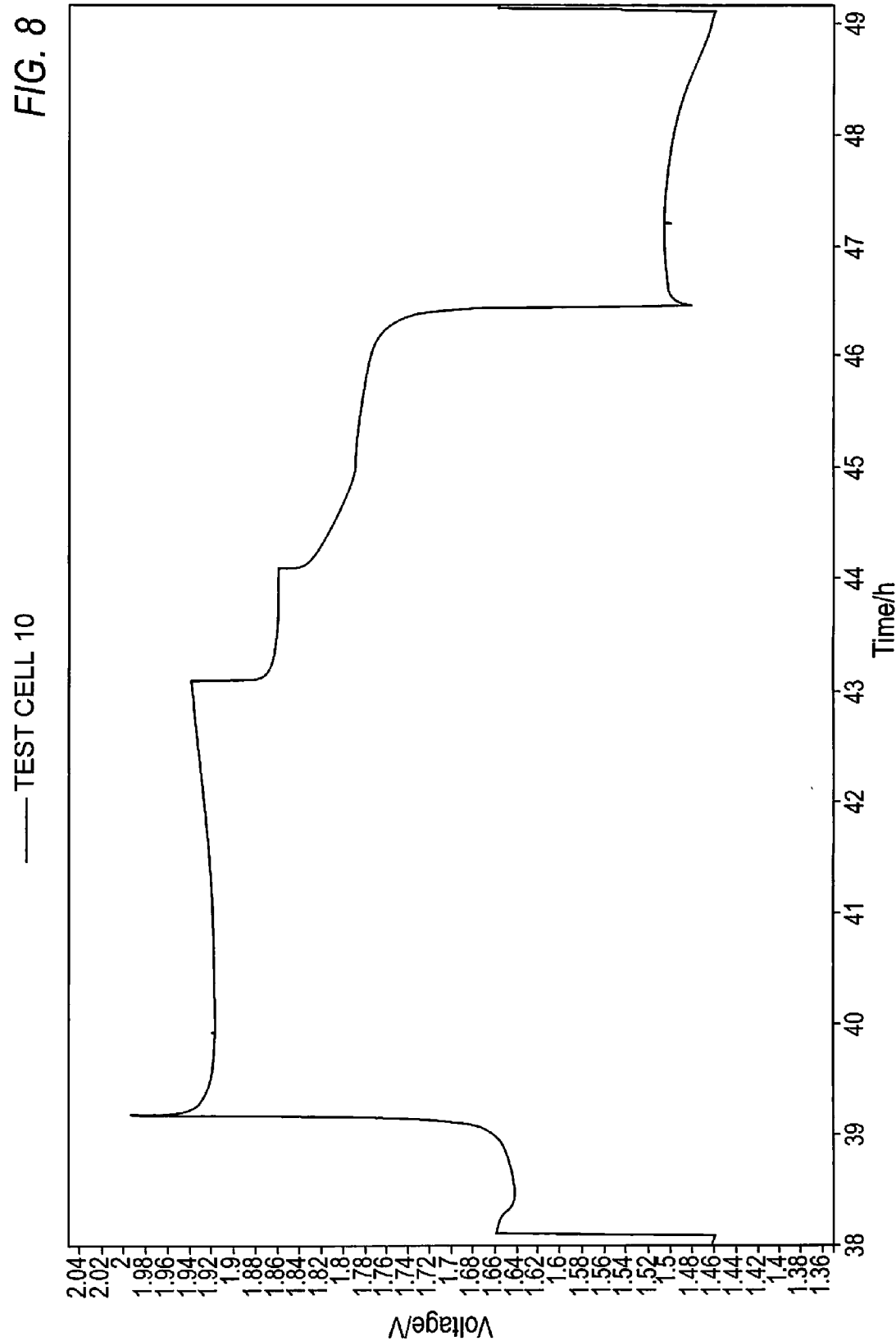
FIG. 8 is a plot of voltage data from a single charge cycle of a 125 mAh test cell of Example 6 formed from cathode materials generated using Method M, using a C/5 charge and C/5 discharge.
Figure 9:
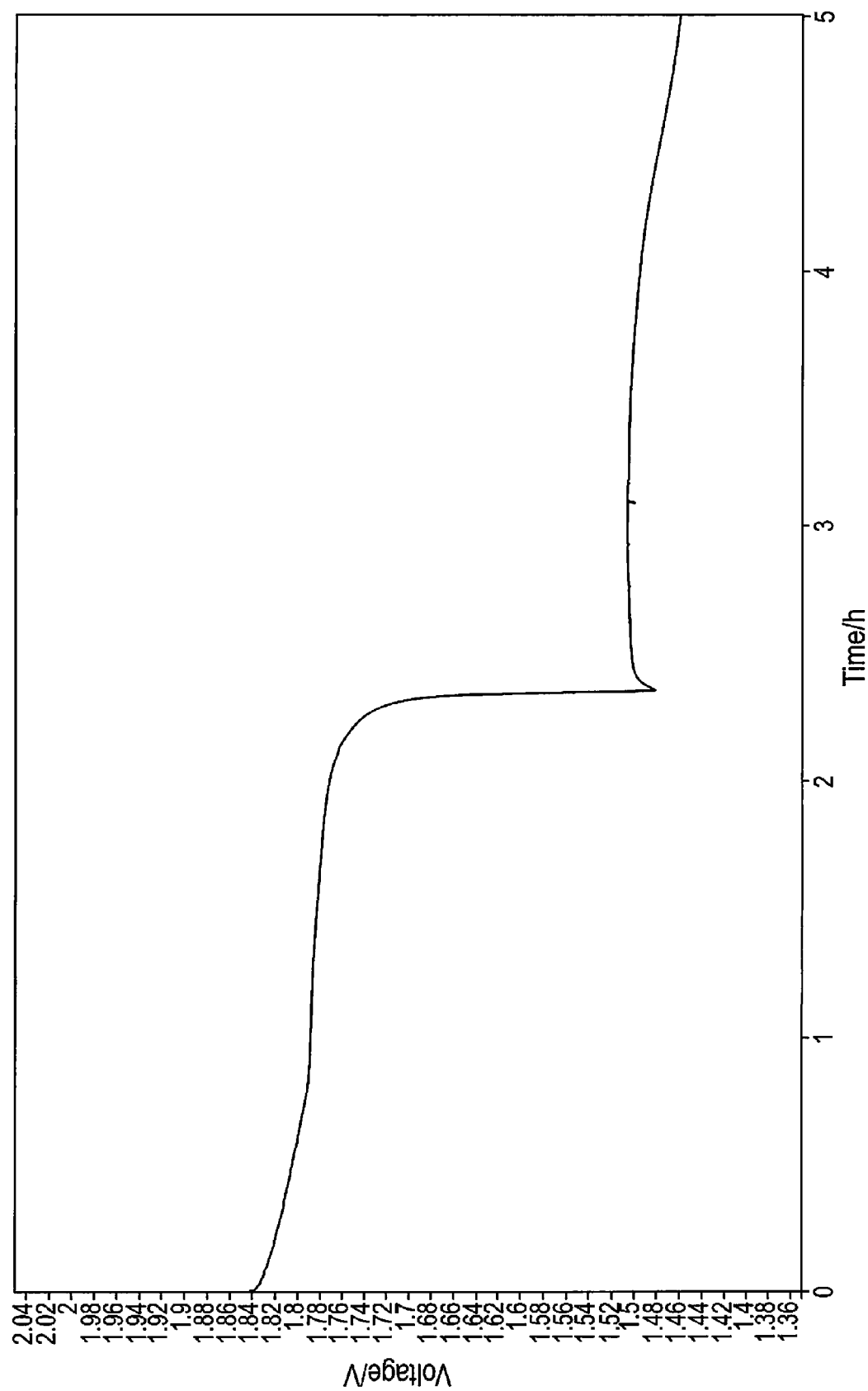
FIG. 9 is a plot of voltage data from a single discharge of a 125 mAh test cell of Example 6 formed from cathode materials generated using Method M, using a C/5 discharge.
Figure 10:
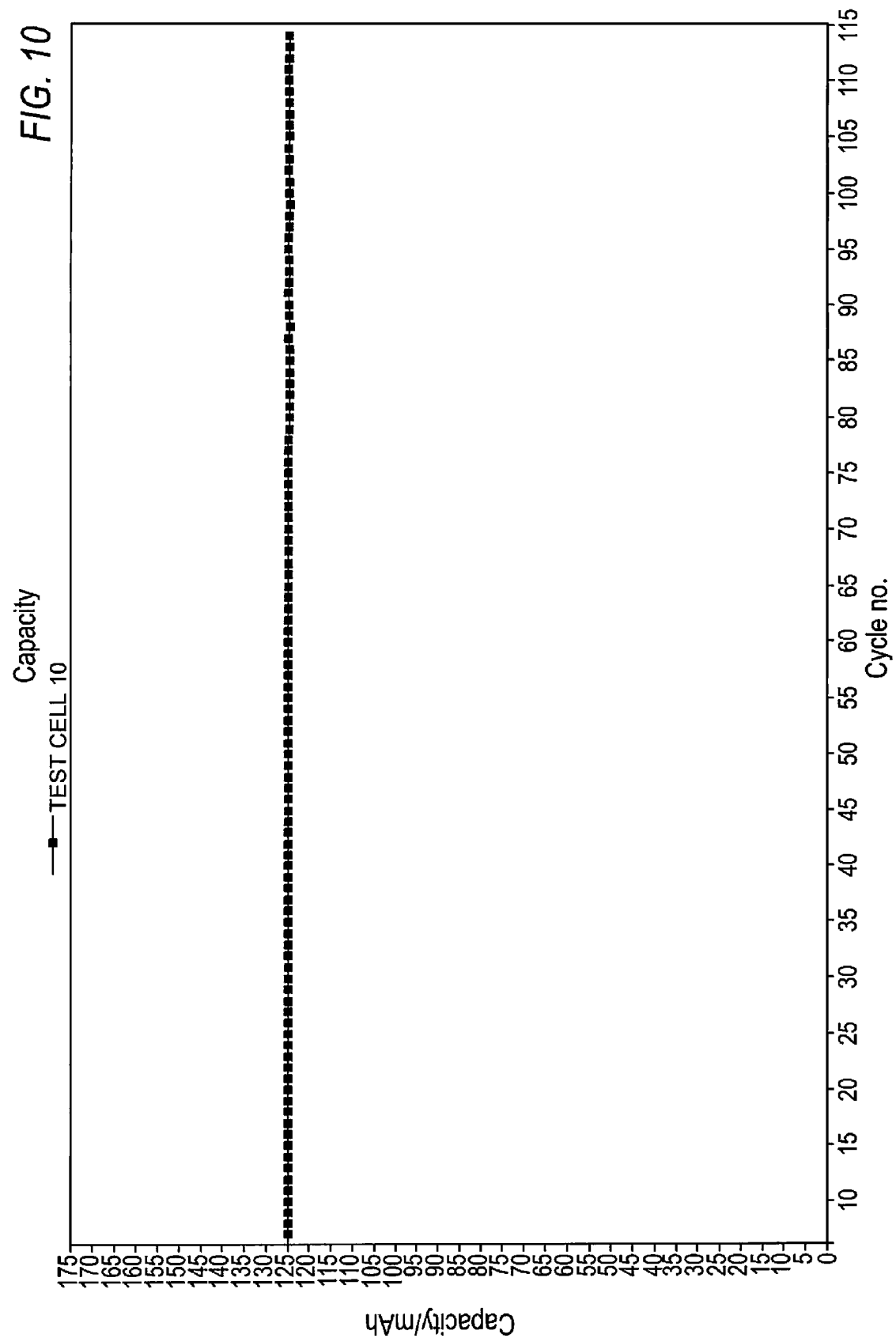
FIG. 10 is a plot of life-cycle data for a 125 mAh test cell of Example 6 formed from cathode materials generated using Method M, using a C/5 charge and C/5 discharge.
Figure 11:
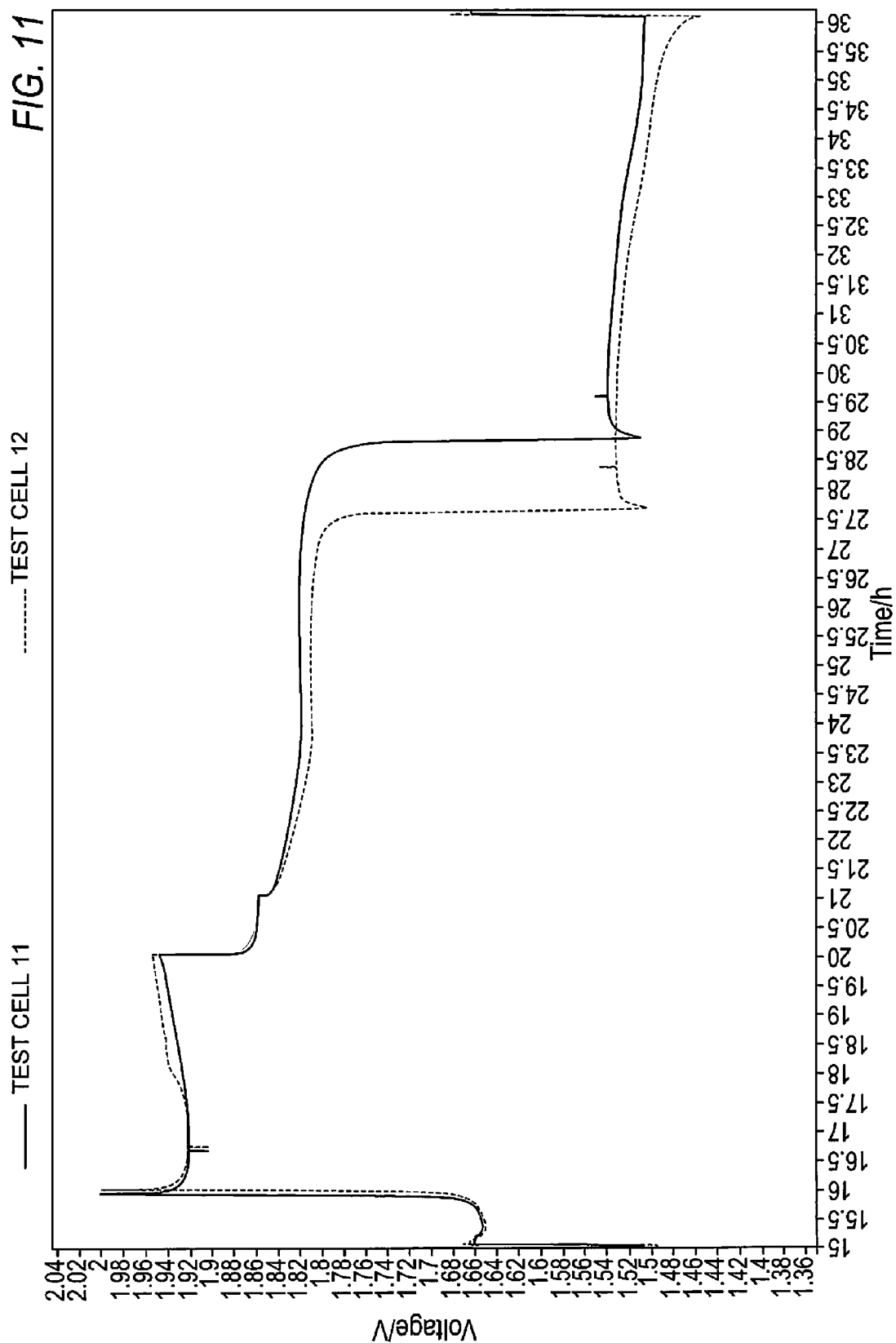
FIG. 11 is a plot of voltage data from a single discharge from two 125 mAh test cells of Example 6 formed from cathode materials generated using Method M, using a C/15 discharge.
Figure 12:
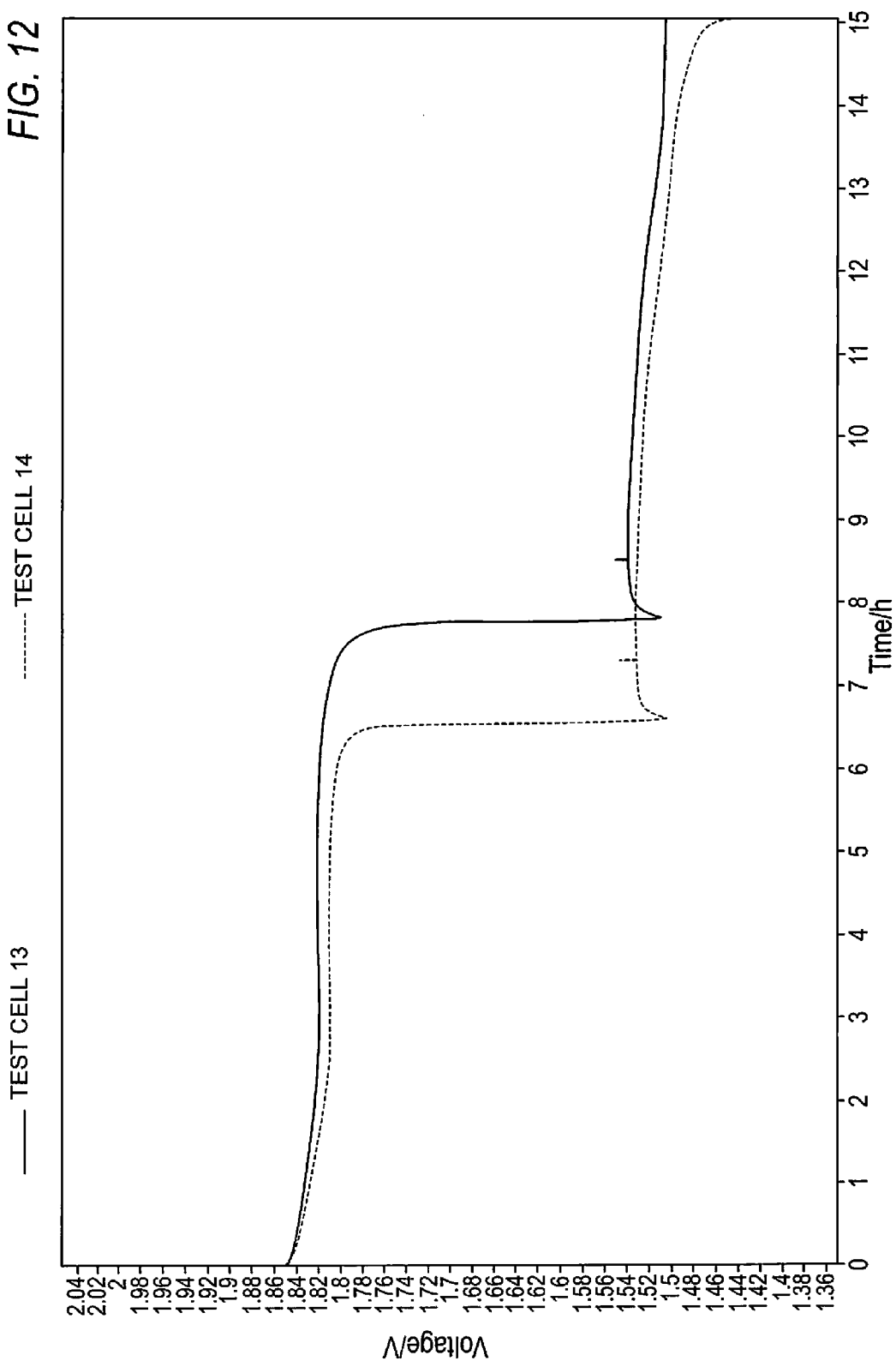
FIG. 12 is a plot of voltage data from a single discharge of two 125 mAh test cells of Example 6 formed from cathode materials generated using Method M, using a C/15 discharge.

Referring to FIGS. 2-13, test cells for evaluating the properties of the doped silver materials in cathodes were manufactured as follows:

Using standard, commercially available, 2032 coin cell components (lid, can, gasket, and crimp ring), the cathode disk was placed into the 2032 can while a Zn/ZnO anode consisting of 85.0% wt Zn, 13.0% wt ZnO, 0.5% wt $Bi_2O_5$, and 1.5% wt PTFE was placed into the lid. The porous electrodes were then filled with electrolyte utilizing an Audionvac VMS 43 (−0.9 bar). A stack of standard battery separators consisting of porous polyethylene and cellophane were placed in between the two electrodes and the battery was crimped shut and tested for the absence of leaks and a stable open circuit voltage. A MACCOR battery tester was then used to cycle the assemble AgO cathode at a constant current charge rate of C/5 and a constant current discharge rate of either C/5 or C/15 with a limit of 2.0V during charge and 1.4V during discharge. Electrolyte: 32% by weight aqueous KOH and NaOH mixture (80/20 mol ratio).

OTHER EMBODIMENTS

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely example embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A cathode for use in an electrochemical cell comprising a silver material that is doped with a silicate dopant comprising one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m, (iii)

wherein the silver material is doped with a concentration of from about 0.01 mol % to about 10 mol % of the silicate dopant.

2. The cathode of claim 1, wherein the doped silver material comprises a powder having a mean particle diameter of about 20 μm or less.

3. The cathode of claim 1, wherein the silver material comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

4. The cathode of claim 3, further comprising a binder, and the binder comprises PTFE or PVDF.

5. The cathode of claim 1, wherein the silicate dopant comprises $K_2SiO_3$.

6. The cathode of claim 1, wherein the silicate dopant comprises $Si(OC_2H_5)_4$.

7. A cathode for use in an electrochemical cell comprising a silver material that is doped with a silicate dopant comprising $K_2SiO_3$, $Si(OC_2H_5)_4$, or any combination thereof, wherein the silver material is doped with a concentration of from about 0.01 mol % to about 10 mol % of the silicate dopant.

8. The cathode of claim 7, wherein the doped silver material comprises a powder having a mean particle diameter of about 20 μm or less.

9. The cathode of claim 7, wherein the silver material comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

10. The cathode of claim 7, further comprising a binder, and the binder comprises PTFE or PVDF.

11. A method of producing a cathode for use in an electrochemical cell comprising:
providing a silver powder that is doped with from about 0.01 mol % to about 10 mol % of a silicate dopant; and
forming the doped silver powder into a cathode,
wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

12. The method of claim 11, wherein the doped silver powder has a mean particle diameter of about 20 μm or less.

13. The method of claim 11, wherein the doped silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

14. The method of claim 11, further comprising providing a binder, and the binder comprises PTFE or PVDF.

15. The method of claim 11, wherein the silicate dopant comprises $K_2SiO_3$, $Si(OC_2H_5)_4$, or any combination thereof.

16. An electrochemical cell comprising:
a cathode comprising a silver material comprising a silicate dopant; and
an anode comprising zinc,
wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m; and (iii)

wherein the silicate dopant is present in a sufficient concentration to impart the cell with an actual capacity of at least about 60% of the cell's rated capacity over at least about 80 cycles.

17. The cell of claim 16, wherein the silver material comprises from about 0.01 mol % to about 10 mol % of silicate dopant.

18. The cell of claim 16, wherein the silver material comprises a powder having a mean particle diameter of about 20 μm or less.

19. The cell of claim 16, wherein the cathode, the anode, or both comprise a binder, and the binder comprises PTFE or PVDF.

20. The cell of claim 16, further comprising an electrolyte comprising NaOH, KOH, or a combination thereof.

21. The cell of claim 16, wherein the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

22. The cell of claim 16, wherein the silicate dopant comprises $K_2SiO_3$, $Si(OC_2H_5)_4$, or any combination thereof.

23. An electrochemical cell comprising:
a cathode comprising a silver powder comprising from about 0.01 mol % to about 10 mol % of a silicate dopant;
an anode comprising zinc; and
an electrolyte comprising aqueous KOH,
wherein the silicate dopant comprises one or more of the following formulae $X_2SiO_3$, wherein X is Li, Na, K, Rb, Cs, or any combination thereof; (i)

$YSiO_3$, wherein Y is Be, Mg, Ca, Sr, Ba, or any combination thereof; or (ii)

$Z_nSi(OR)_m$, wherein Z is a halogen, R is H or a $C_{1-18}$ alkyl group, m is 0-4, and n is 4-m. (iii)

24. The cell claim 23, wherein the silver powder has a mean particle diameter of about 20 μm or less.

25. The cell of claim 23, wherein the cathode, the anode, or both comprise a binder, and the binder comprises PTFE or PVDF.

26. The cell of claim 23, wherein the electrolyte further comprises NaOH.

27. The cell of claim 23, wherein the silver powder comprises Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof.

28. The cell of claim 23, wherein the silicate dopant comprises $K_2SiO_3$, $Si(OC_2H_5)_4$, or any combination thereof.

* * * * *